United States Patent
Anderson et al.

(10) Patent No.: US 10,711,477 B1
(45) Date of Patent: Jul. 14, 2020

(54) DUCTILE PREFABRICATED SHEAR PANEL

(71) Applicant: Simpson Strong-Tie Company Inc., Pleasanton, CA (US)

(72) Inventors: Travis R. Anderson, Sacramento, CA (US); Caleb J. Knudson, Dublin, CA (US)

(73) Assignee: Simpson Stong-Tie Company Inc., Pleasanton, CA (US)

( * ) Notice: Subject to any disclaimer, the term of this patent is extended or adjusted under 35 U.S.C. 154(b) by 0 days.

(21) Appl. No.: 16/400,460

(22) Filed: May 1, 2019

(51) Int. Cl.
  *E04H 9/02* (2006.01)
  *E04B 1/98* (2006.01)
  *E04B 1/26* (2006.01)
  *E04B 1/24* (2006.01)

(52) U.S. Cl.
  CPC .......... *E04H 9/02* (2013.01); *E04B 1/98* (2013.01); *E04H 9/027* (2013.01); *E04B 2001/2496* (2013.01); *E04B 2001/2696* (2013.01)

(58) Field of Classification Search
  CPC ..... E04B 2001/2496; E04B 2001/2696; E04B 1/98; E04H 9/02; E04H 9/027
  See application file for complete search history.

(56) References Cited

U.S. PATENT DOCUMENTS

| | | | |
|---|---|---|---|
| 7,458,187 B2 * | 12/2008 | Hulls | E04H 9/02 52/167.3 |
| 7,712,282 B2 * | 5/2010 | Robertson | E04B 1/2604 403/232.1 |
| 9,809,979 B2 | 11/2017 | Palermo et al. | |
| 10,081,961 B1 * | 9/2018 | Blomgren | E04B 1/4178 |
| 10,267,053 B2 * | 4/2019 | Blomgren | E04H 9/027 |
| 2006/0144008 A1 * | 7/2006 | Fouch | E04B 1/26 52/292 |
| 2009/0084056 A1 * | 4/2009 | Robertson | E04B 1/2604 52/396.05 |
| 2018/0363317 A1 * | 12/2018 | Blomgren | E04H 9/027 |
| 2019/0292783 A1 * | 9/2019 | Pryor | E04C 3/38 |

* cited by examiner

*Primary Examiner* — Andrew J Triggs
(74) *Attorney, Agent, or Firm* — Vierra Magen Marcus LLP

(57) ABSTRACT

A shearwall is disclosed for use in lightweight or other constructions to transmit lateral shear forces and dissipate energy on the construction. In examples, the shearwall includes a central panel formed of wood, and side plates formed of steel. The side plates may be affixed at lower corners of first and second opposed surfaces of the central panel. Each side plate may include a fastening plate for affixing the side plate to the central panel, and a restraint plate which fits within a reduced area section of the central panel between the first and second surfaces.

19 Claims, 20 Drawing Sheets

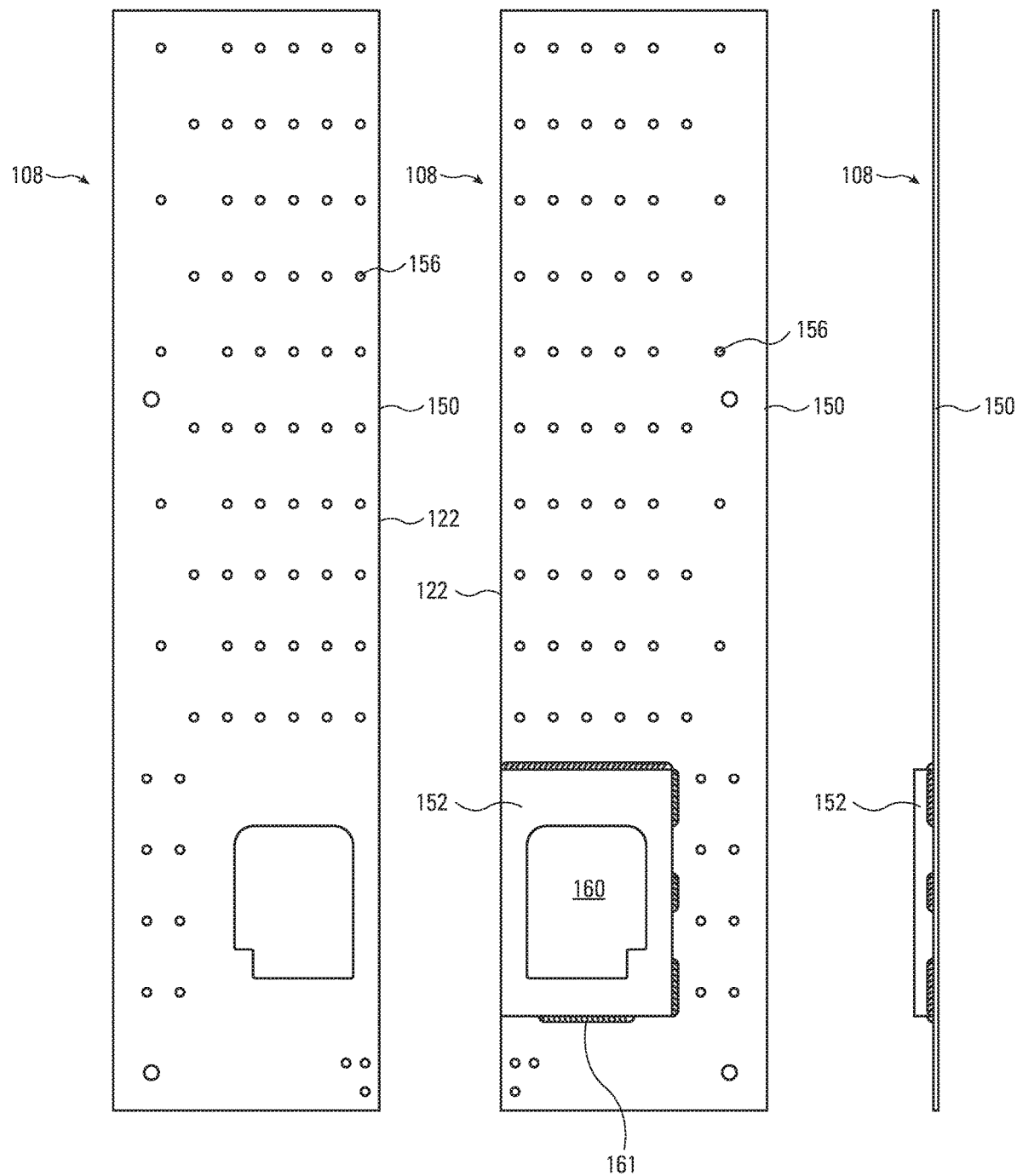

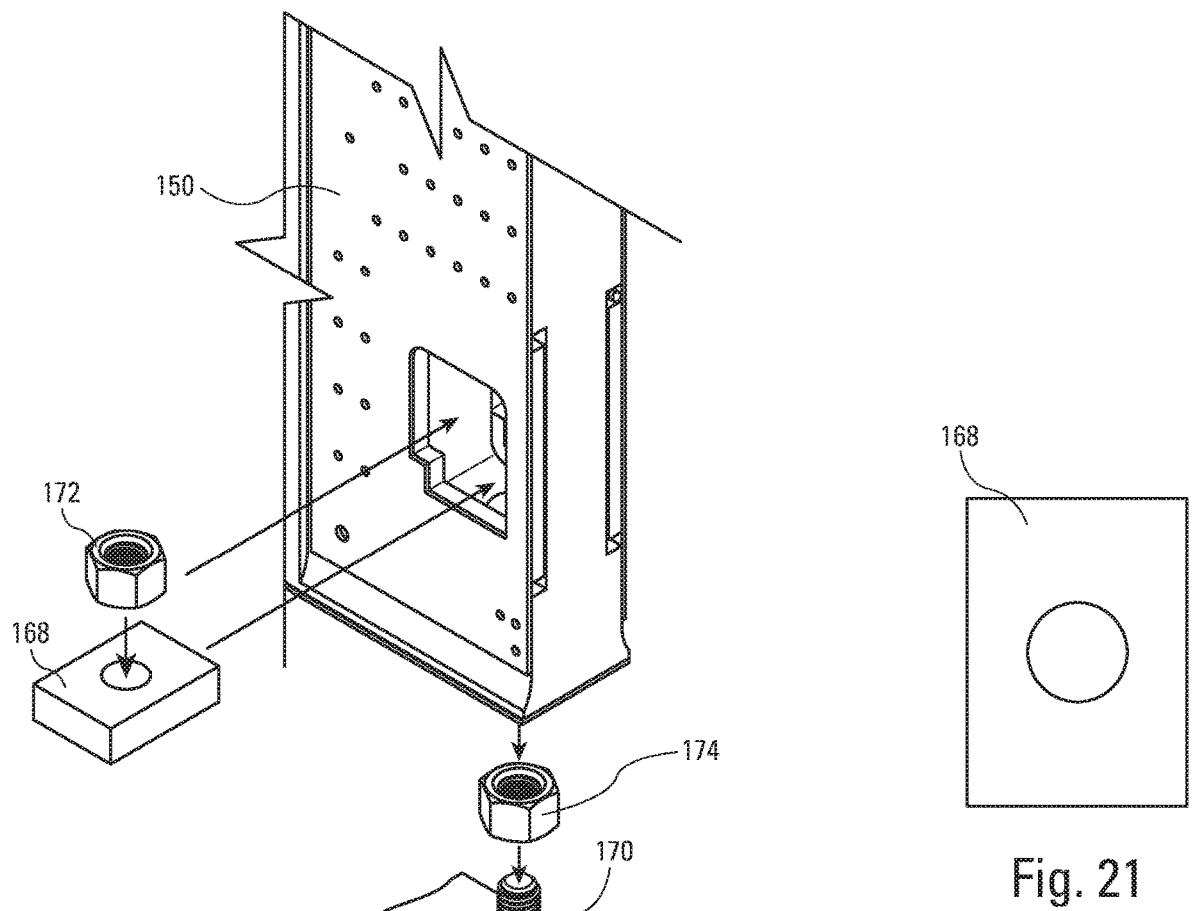
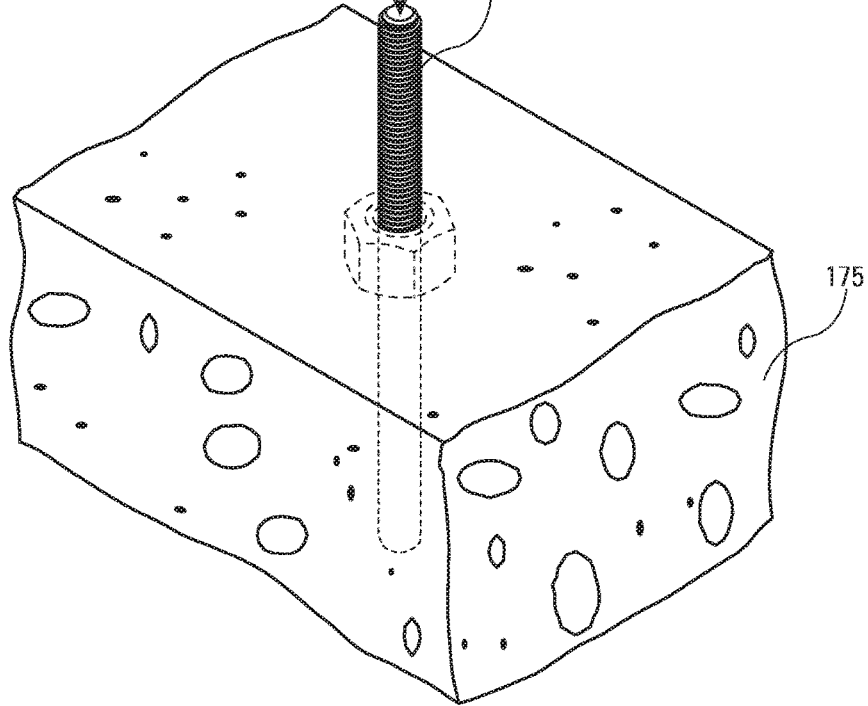
Fig. 21
Fig. 20

US 10,711,477 B1

DUCTILE PREFABRICATED SHEAR PANEL

BACKGROUND

Shearwalls were developed to counteract the potentially devastating effects of natural phenomena such as seismic activity, high winds, floods and snow loads on the structural integrity of light-framed constructions. Prior to shearwalls and lateral bracing systems, lateral forces generated during these natural phenomena often caused the top portion of a wall to move laterally with respect to the bottom portion of the wall, which movement could result in structural failure of the wall and, in some instances, collapse of the building.

Shearwalls within wall sections of light-framed constructions provide lateral stability and allow the lateral forces in the wall sections to be transmitted through the shearwalls between the upper portions of the wall and the floor diaphragm or foundation of the building where they are dissipated without structural effect on the wall or building. While various shearwall designs are known, there is a constant demand for improved shearwalls providing greater structural performance relating to strength, stiffness, ductility and energy dissipation.

SUMMARY

The present technology relates to a shearwall for use in lightweight or other constructions to transmit lateral shear forces and dissipate energy on the construction. In examples, the shearwall includes a central panel formed of wood, and side plates formed of steel. The side plates may be affixed at lower corners of first and second opposed surfaces of the central panel. Each side plate may include a fastening plate for affixing the side plate to the central panel, and a restraint plate which fits within a reduced area section of the central panel between the first and second surfaces. The reduced area section provides a predictable and controllable location of yielding of the shearwall. The restraint plates add ductility to the shearwall after initial failure, by bearing against the central panel after initial yield at the reduced area section.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 8 is a front view of a first side plate assembly according to embodiments of the present technology.

FIG. 9 is a rear view of a first side plate assembly according to embodiments of the present technology.

FIG. 10 is an edge view of a first side plate assembly according to embodiments of the present technology.

FIG. 20 is an exploded perspective view showing an anchor bolt and bearing washer plate for affixing the corners of the shearwall 100 to a foundation.

FIG. 21 is a front view of a bearing washer plate according to embodiments of the present technology.

DETAILED DESCRIPTION

Figure 1:
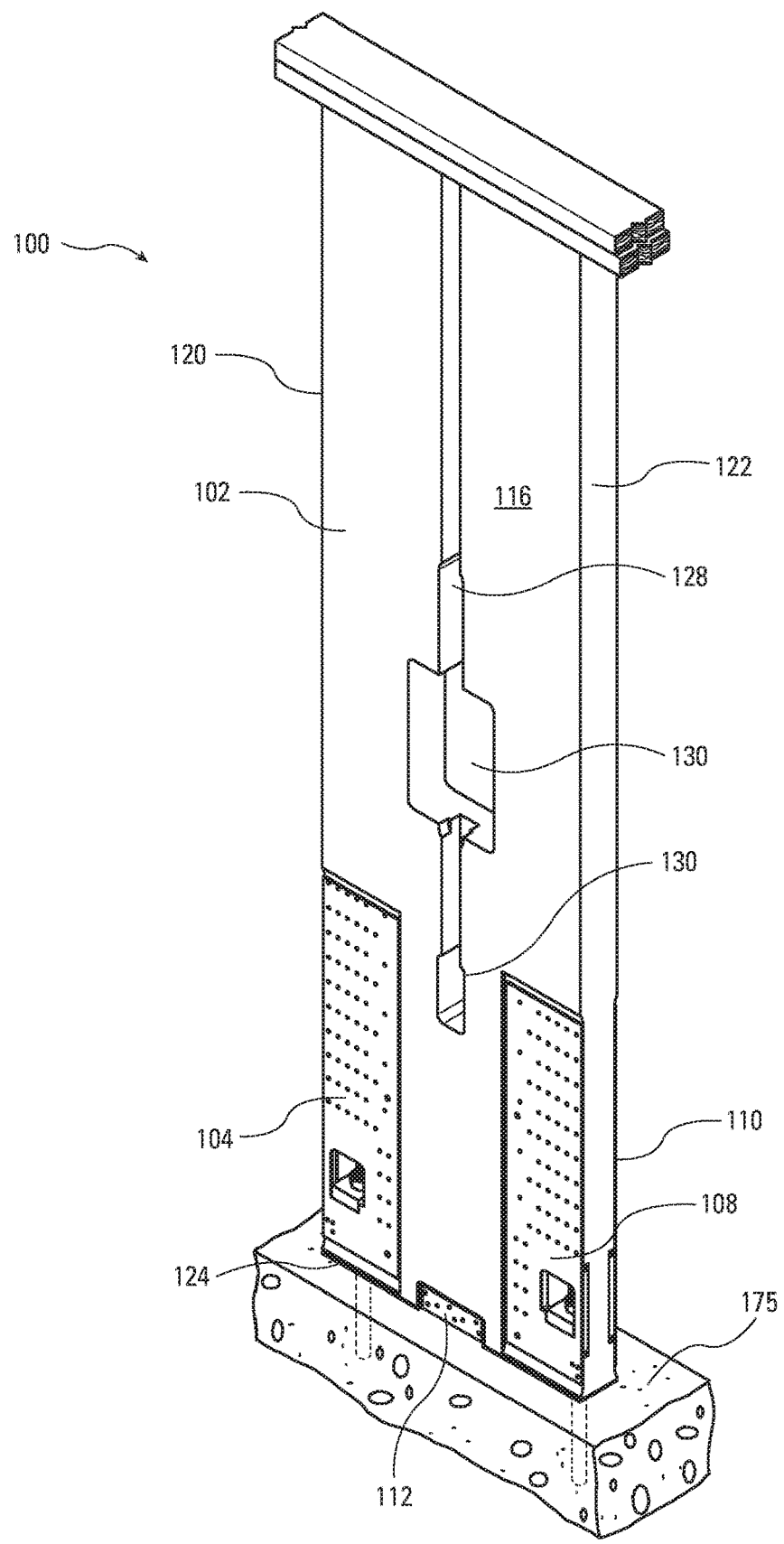
FIG. 1 is a perspective view of a shearwall according to embodiments of the present technology.

The present technology, roughly described, relates to a shearwall having a high degree of stiffness, strength and ductility for transmitting lateral forces and dissipating energy within a light-frame or other construction. The shearwall includes a central panel and side plates at the lower corners of front and rear surfaces of the central panel. The side plates may be affixed to the central panel as by nails, screws and/or structural bonding, and are used to secure the central panel to a foundation or other support surface for the construction. In particular, a pair of anchor bolts may be provided up through a bottom surface of shearwall and into openings formed in respective pairs of side plates. Bearing plate washers may then be provided in the openings, over the anchor bolts and supported on the side plates. Hex nuts may then be used to secure the anchor bolts to the bearing plate washers. By tightening the hex nuts, the plurality of side plates may be engaged to remove slack from the shearwall as explained below.

The side plates may each include a fastening plate and a restraint plate welded or structurally bonded onto or otherwise formed on the fastening plate. The side plates may be mounted in recessed sections formed in the central panel, at the lower corners of the front and rear surfaces of the central panel. Each recessed section may include a first recess for receiving the fastening plate, and a second, deeper recess for receiving the restraint plate. The deeper recesses formed in the front and rear surfaces of the central panel together define a section of the central panel having a narrower width, extending to edges of the central panel. This narrow width section at the edges of the central panel defines a structural fuse element in the shearwall as explained below.

The central panel and side plates provide a high degree of stiffness and strength to the shearwall to transmit lateral shear forces on the shearwall down into the foundation. When the imposed lateral forces transmitted to the shearwall result in internal stresses that exceed the compressive buckling or tensile fracture capacity of the fuse element, the structural fuse will fail at a defined and controllable location. Upon such buckling or fracture at the fuse elements, the pair of restraint plates serve to maintain the structural integrity of the shearwall at fuse element locations, and add a high degree of ductility and energy dissipation to the shearwall after initial fracture due to bearing against the shoulder of the central panel.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±2.5% of a stated dimension.

FIGS. 1-4 illustrate perspective, front, rear and edge views, respectively, of a shearwall 100 according to embodiments of the present technology. The shearwall 100 includes a central panel 102, four side plate assemblies 104, 106, 108 and 110, and a bottom plate 112. The central panel 102 may be formed of a material having high strength and stiffness such as for example natural and/or engineered wood. Examples of engineered wood that may be used in panel 102 include but are not limited to glulam or structural composite lumber, such as cross laminated timber, laminated veneer lumber, laminated strand lumber, and parallel strand lumber. The central panel 102 may be formed of other materials in further embodiments including for example various metals, plastics, composites and/or polymers.

The central panel 102 may in general be a planar member including a first, or front, planar surface 116, and a second, or rear, planar surface 118 opposed to the front surface 116. Edges 120, 122 may extend the length of the shearwall 100, between the front and rear surfaces 116, 118. The central panel 102 may further include a bottom edge 124 and a top edge 126. The length, width and thickness of the central panel 102 may vary, depending for example on the construction within which it is used, but in one embodiment, the central panel 102 may be 93 inches long, 24 inches wide and 3 7/16 inches thick. These dimensions may vary proportionately or disproportionately with respect to each other.

Figure 2:
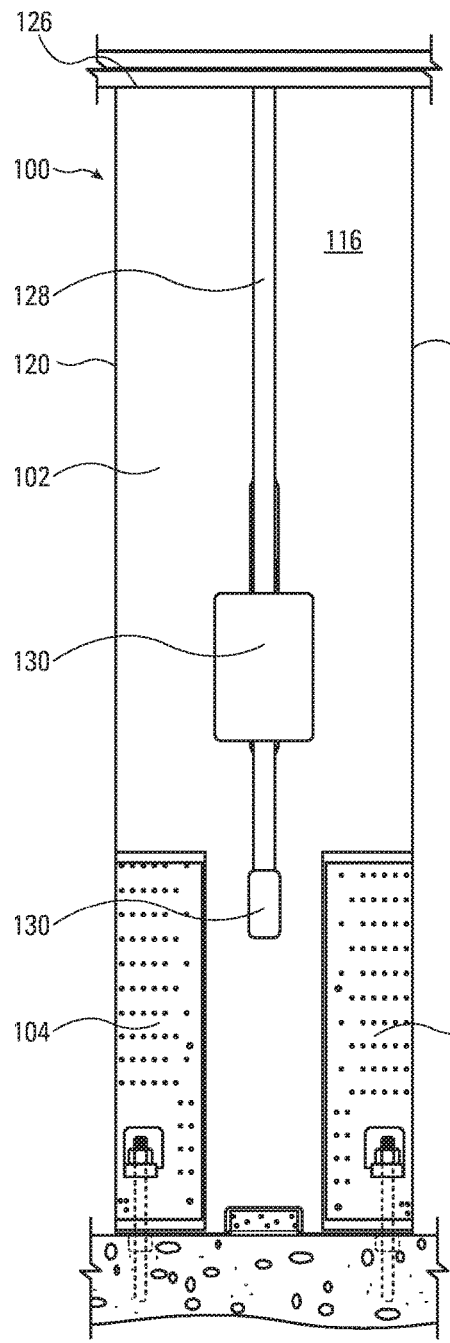
FIG. 2 is a front view of a shearwall according to embodiments of the present technology.
Figure 3:
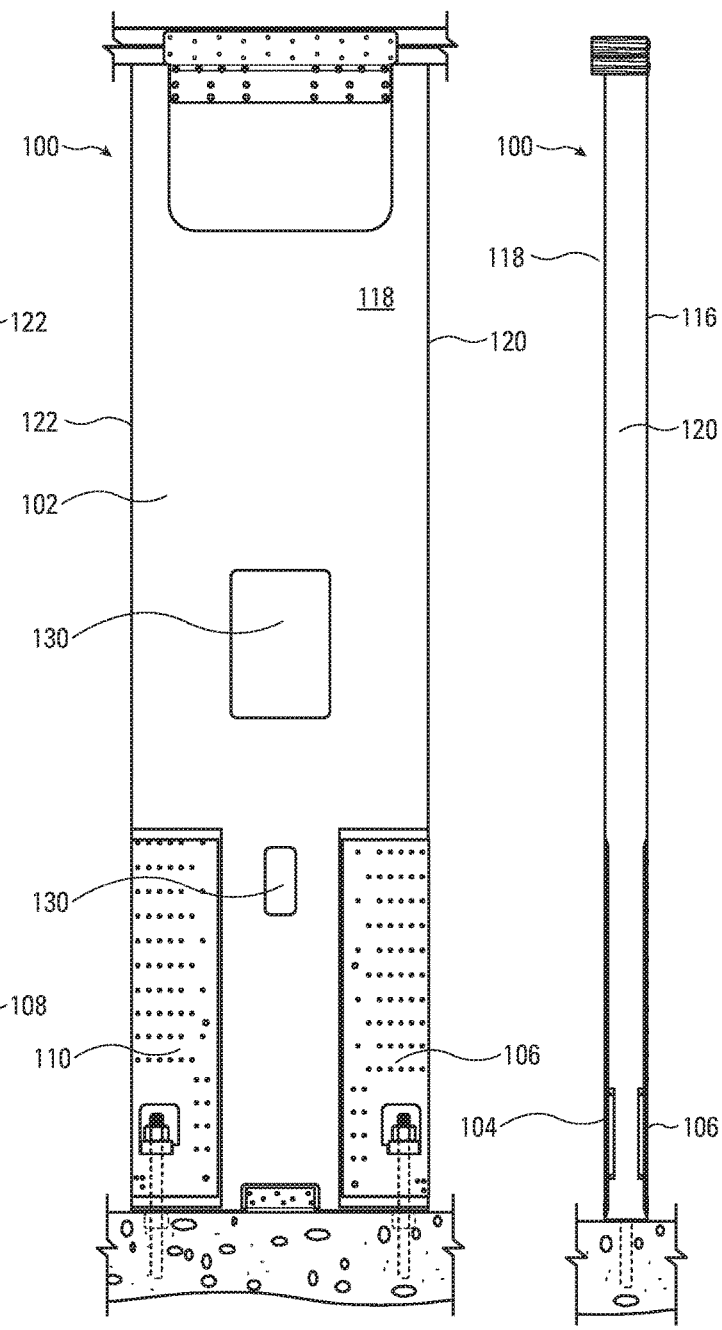
FIG. 3 is a rear view of a shearwall according to embodiments of the present technology.
Figure 4:
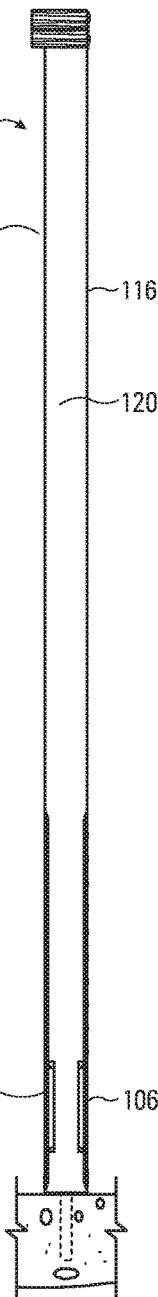
FIG. 4 is an edge view of a shearwall according to embodiments of the present technology.

As shown for example in FIGS. 1 and 2, the central panel 102 may include a chase 128 for receiving wires, cables and the like, and apertures 130 for receiving electrical or structural components, boxes and the like. While chase 128 is shown in the front planar surface 116, the chase 128 may additionally or alternatively be provided in the rear planar surface 118 in further embodiments. Additionally, the positioning of the chase 128 and the apertures 130 are shown by way of example only, and may be in other positions in the central panel 102 in further embodiments.

Figure 5:
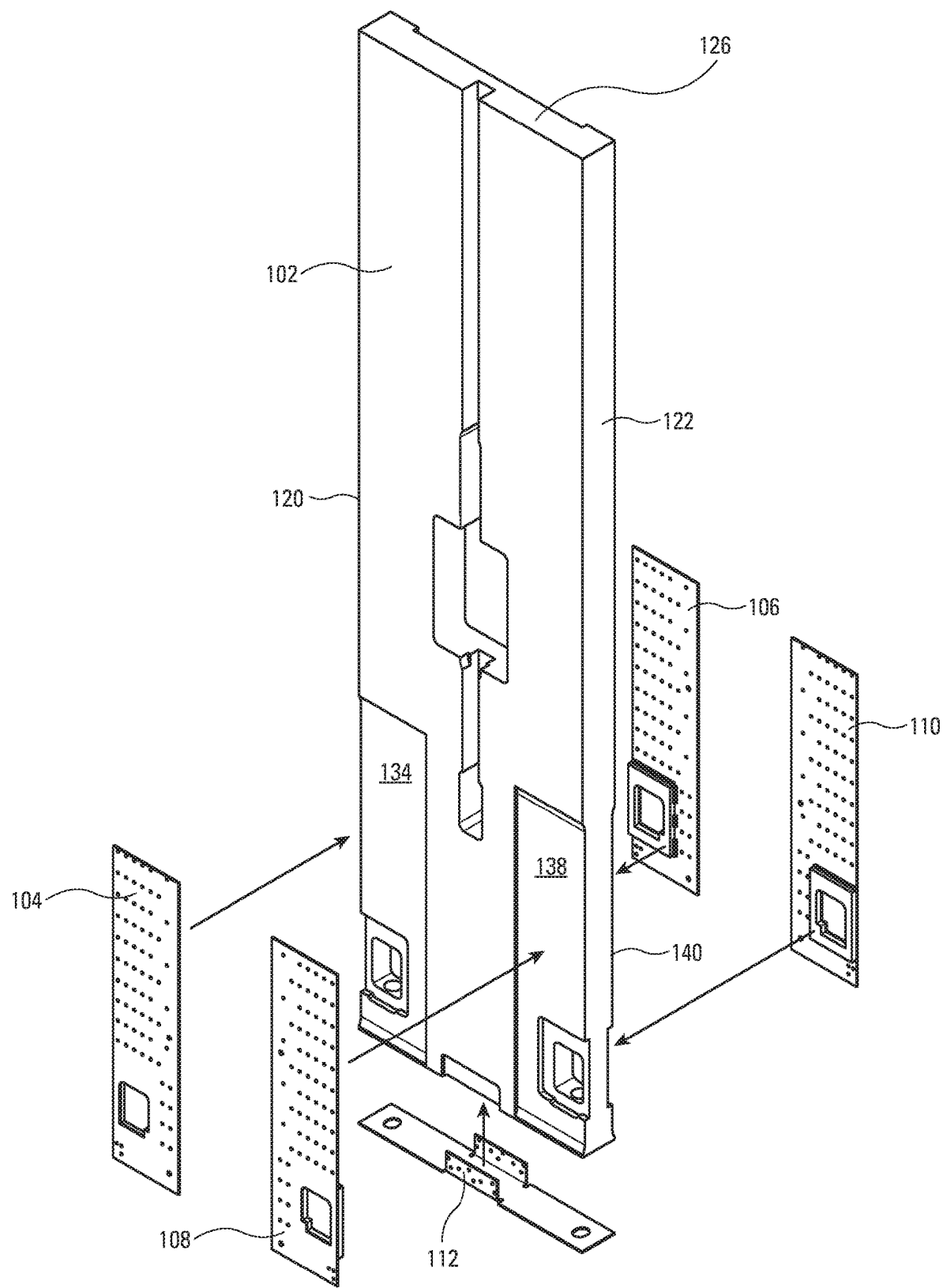
FIG. 5 is an exploded perspective view of a shearwall according to embodiments of the present technology with the side plate assemblies separated from the central panel.

FIG. 5 is an exploded perspective view of shearwall 100 illustrating that side plate assemblies 104, 106, 108 and 110 fit within respective recessed sections 134, 136, 138 and 140 formed in the front and rear planar surfaces 116, 118 of central panel 102. The recessed sections 134, 136, 138 and 140 may be formed, as by routing, at sides of the front and rear planar surfaces 116, 118, adjacent edges 120 and 122, near a bottom of the shearwall 100. The recessed sections 134 and 136 may be aligned with each other in the front and rear planar surfaces 116, 118 adjacent edge 120. The recessed sections 138 and 140 may be aligned with each other in the front and rear planar surfaces 116, 118 adjacent edge 122.

Figure 6:
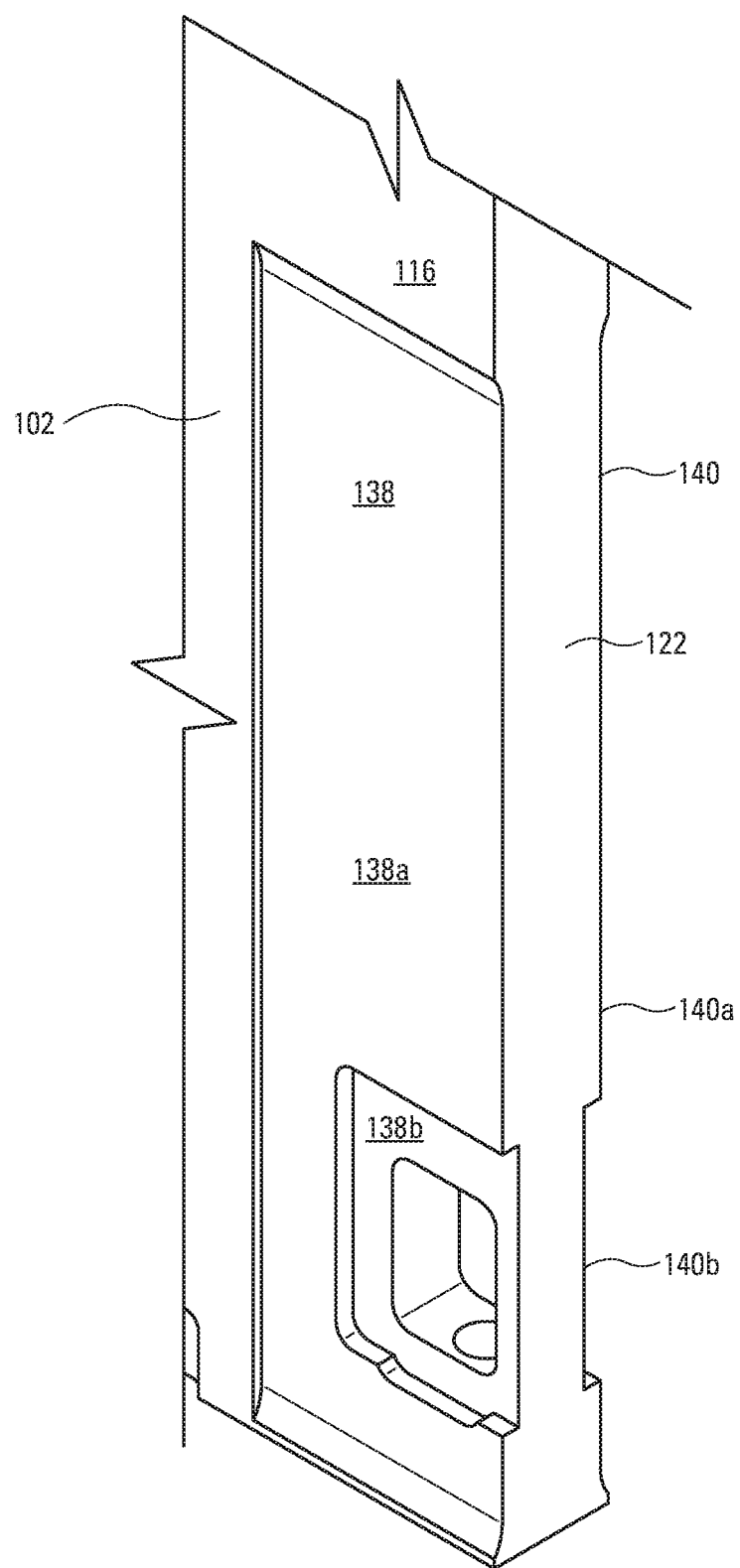
FIG. 6 is an enlarged perspective view of a lower corner of the central panel according to embodiments of the present technology.

FIG. 6 shows greater detail of recessed sections 138 and 140 at the lower corners of the front and rear planar surfaces 116, 118. Recessed section 138 includes a first recess 138a formed to a first depth into surface 116, and a second recess 138b formed to a second, deeper depth into surface 116. In embodiments, the first recess 138a may generally be rectangular, extending to edge 122 and having a width of 7¼ inches. The first recess 138a may have a length of 29¼ inches and may start 1 inch from the bottom of the central panel 102. In embodiments, the first recess may have a depth of 7/32 of an inch. The recess 140a of recessed section 140 may have the same position and dimensions. It is understood that each of these dimensions is set forth by way of example, and each may vary proportionately or disproportionately with respect to each other in further embodiments.

Figure 7:
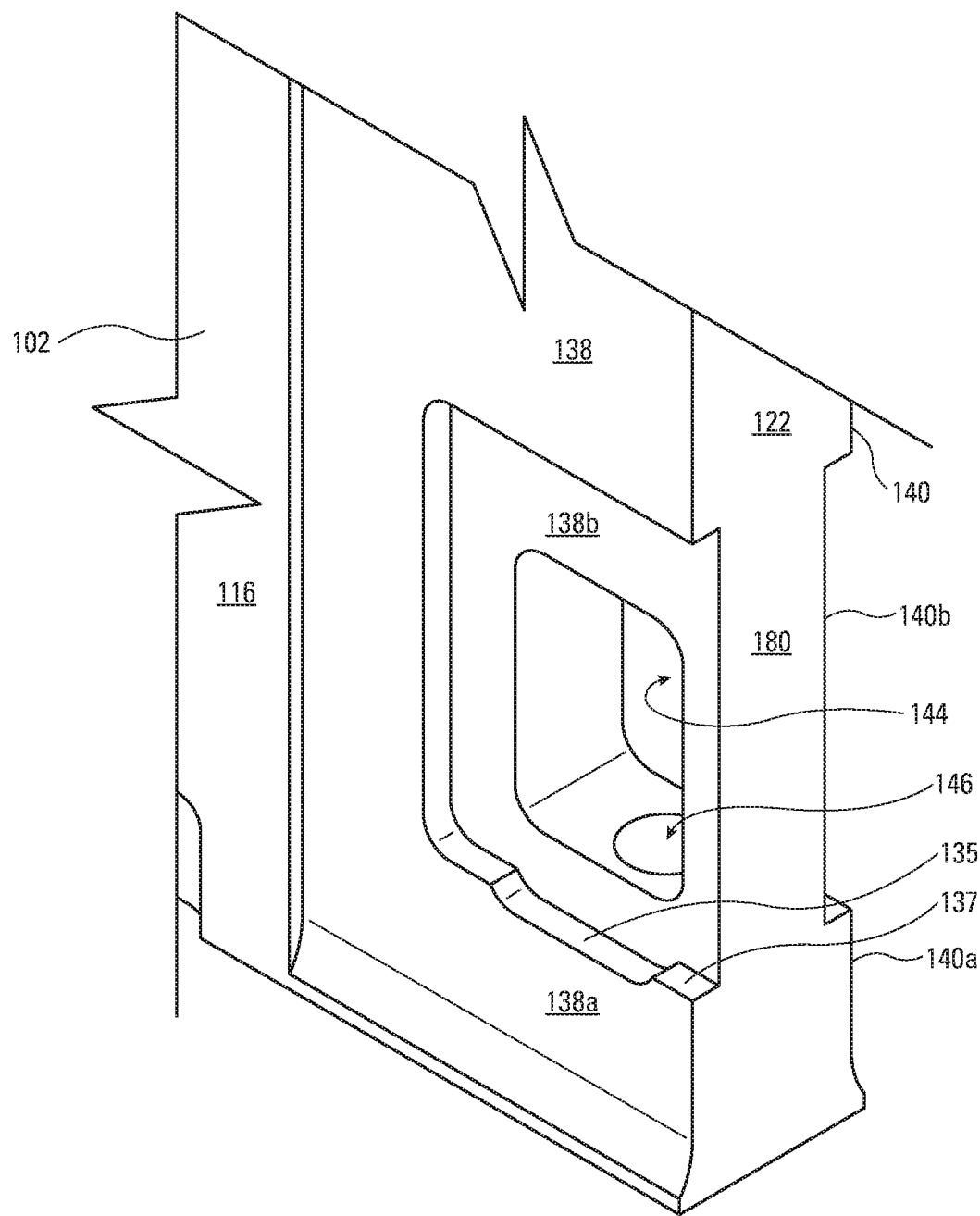
FIG. 7 is a further enlarged perspective view of a lower corner of the central panel according to embodiments of the present technology.

FIG. 7 shows greater detail of the second recess 138b at the lower corner of the front planar surface 116. In embodiments, the second recess 138b may generally be rectangular, extending to edge 122 and having a width of 4⅞ inches. The second recess 138b may have a length of 7⅜ inches and may be spaced 3⅛ inches from the bottom of the central panel 102 to a height of a shoulder 137. In embodiments, the second recess 138b may have a depth of ½ inch relative to the first recess 138a (or ²³⁄₃₂ of an inch from the planar surface 116). The recess 140b of recessed section 140 may have the same position and dimensions. It is understood that each of these dimensions is set forth by way of example, and each may vary proportionately or disproportionately with respect to each other in further embodiments.

The recesses 138b and 140b may have a bottom edge defined by a first elevation including a shoulder 137, and a second, lower elevation including a detent 135, adjacent the shoulder 137. The detent may, for example, extend ¼ to ½ inch lower than shoulder 137. The recess 140b of recessed section 140 may have the same shoulder and detent. As will be explained hereinafter, upon deformation of the central panel 102, a lower edge of a portion of the restraint plate 152 may abut against the shoulder 137, while a weld affixing the restraint plate 152 to the fastening plate 150 may fit within the detent 135.

An opening, referred to herein as anchor bolt opening 144, may be formed within a central portion of the second recesses 138b and 140b. The anchor bolt opening 144 may extend completely through the central panel 102, i.e., from the second recess 138b through to the second recess 140b. In embodiments, the anchor bolt opening 144 may generally be rectangular, with a length of 4⅜ inches and a width of 3⅛ inches. The anchor bolt opening 144 may be spaced ¹¹⁄₁₆ inches from edge 122, and 4¼ inches from the bottom of the central panel 102. These dimensions are set forth by way of example, and may vary proportionately or disproportionately with respect to each other in further embodiments.

A bore, referred to herein as anchor bolt bore 146 may extend from the bottom edge 124 of the central panel 102 up into the anchor bolt opening 144. The anchor bolt bore 146 may have a diameter of 1.125 inches, but this diameter may vary in further embodiments.

FIGS. 6 and 7 show detail of recessed sections 138, 140, anchor bolt opening 144 and anchor bolt bore 146 in at a first side of panel 102 adjacent edge 122. It is understood that recessed sections 134 and 136 may similarly each include first and second recesses having the same corresponding dimensions and positions relative to edge 120 and the bottom edge 124 of the central panel 102. A second anchor bolt opening 144 and a second anchor bolt bore 146 may also be provided adjacent edge 120 as described above with respect to FIGS. 6 and 7.

Figures 11, 12:
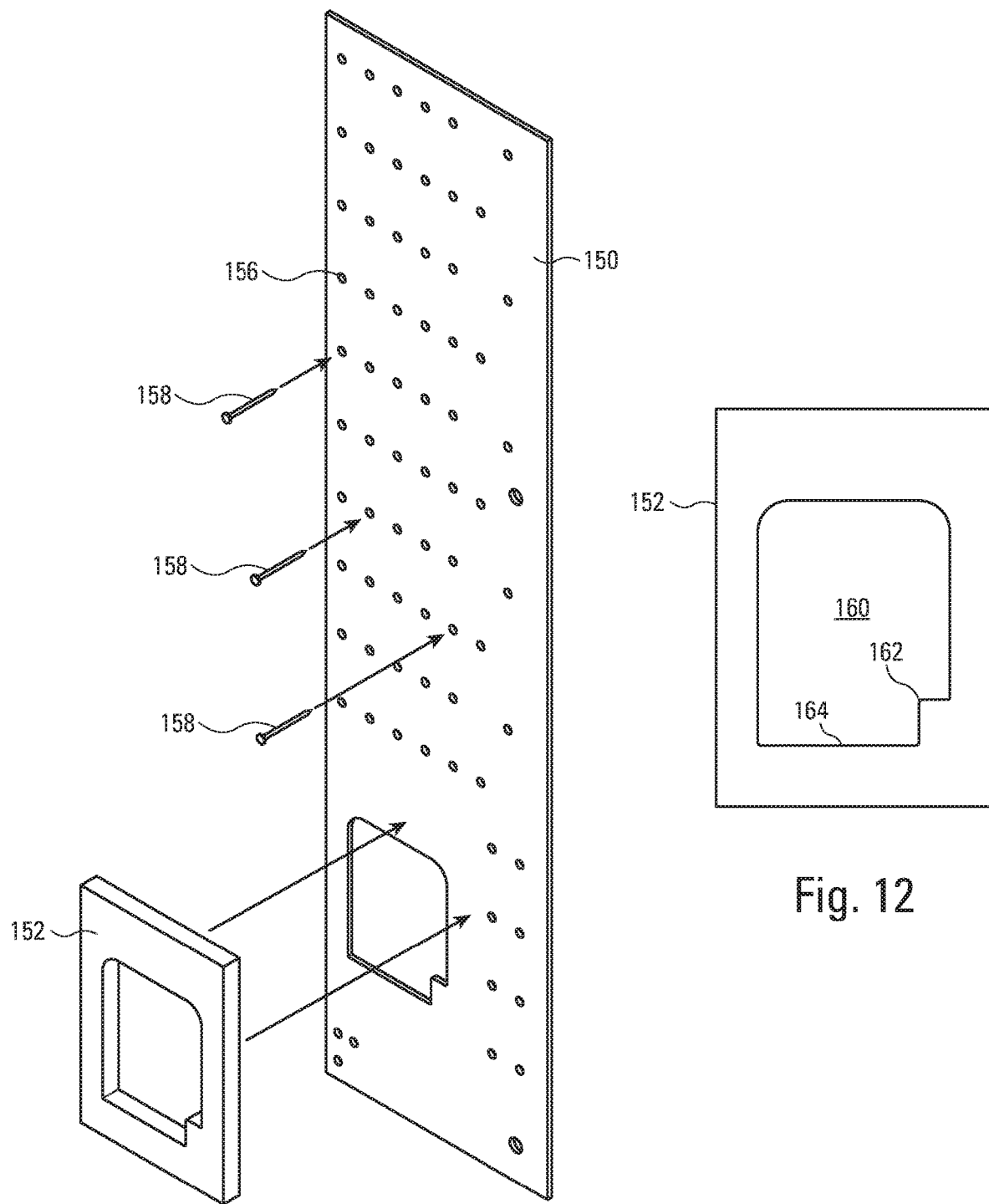
FIG. 11 is an exploded perspective view of a first side plate assembly showing the restraint plate being affixed to the fastening plate according to embodiments of the present technology.
FIG. 12 is a front view of a first restraint plate according to embodiments of the present technology.
Figure 13:
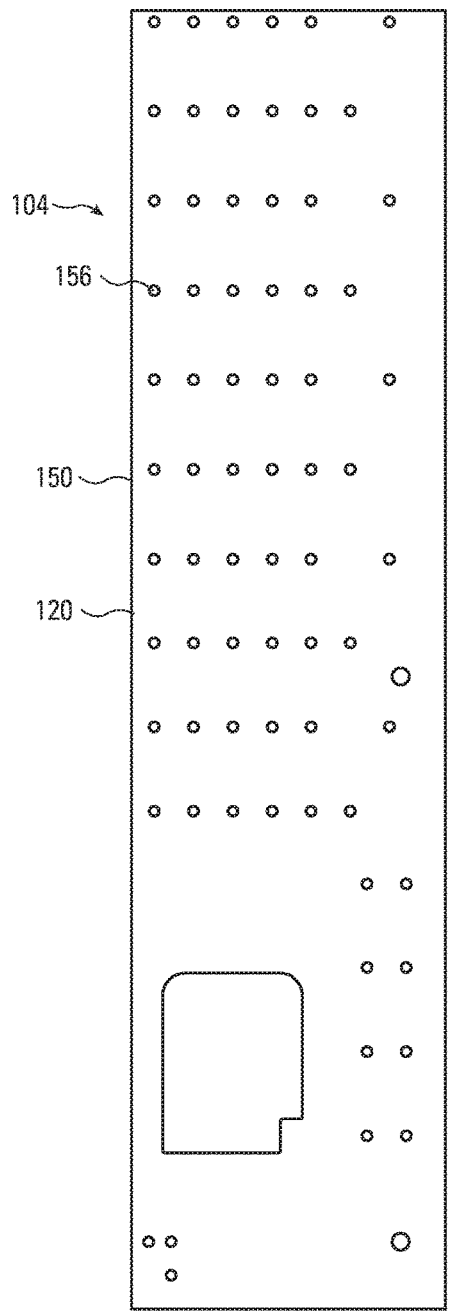
FIG. 13 is a front view of a second side plate assembly according to embodiments of the present technology.
Figure 14:
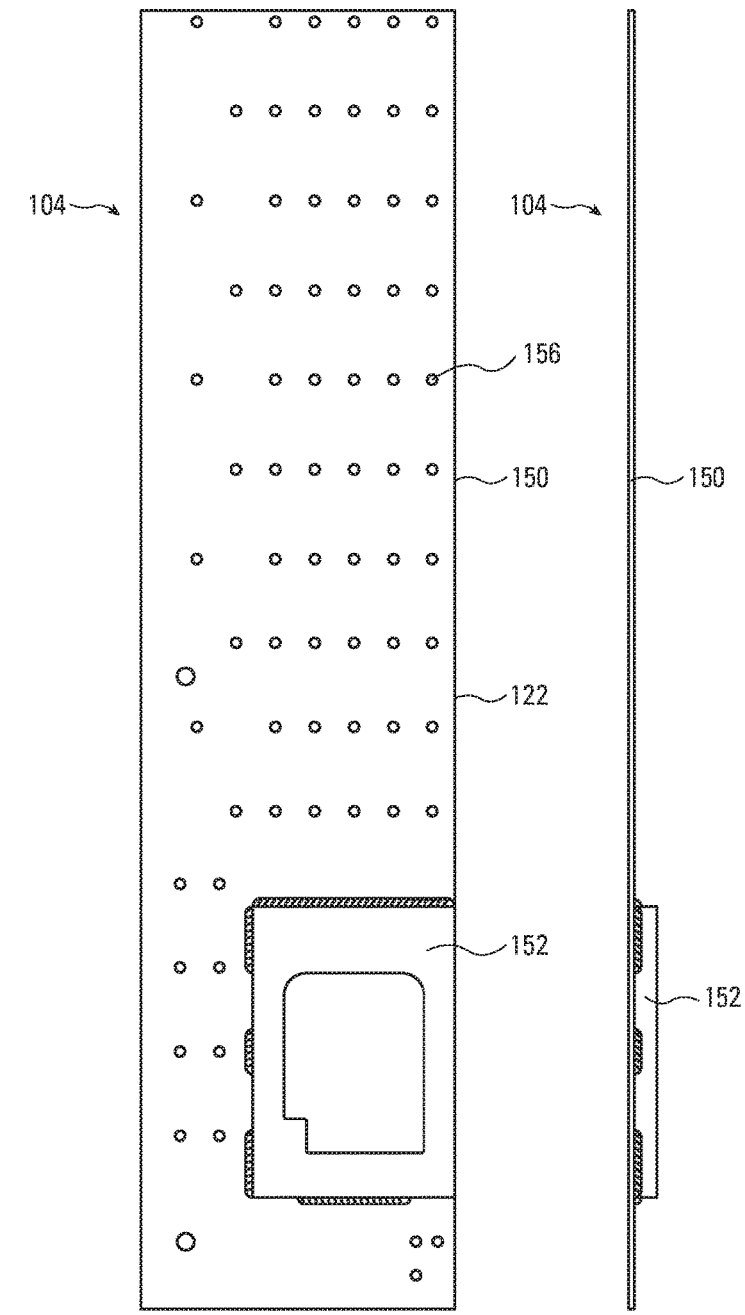
FIG. 14 is a rear view of a second side plate assembly according to embodiments of the present technology.
Figure 15:
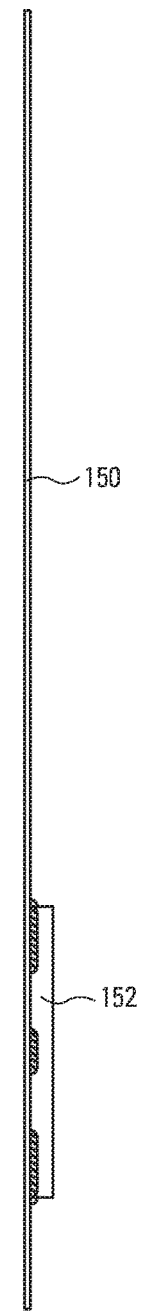
FIG. 15 is an edge view of a second side plate assembly according to embodiments of the present technology.
Figures 16, 17:
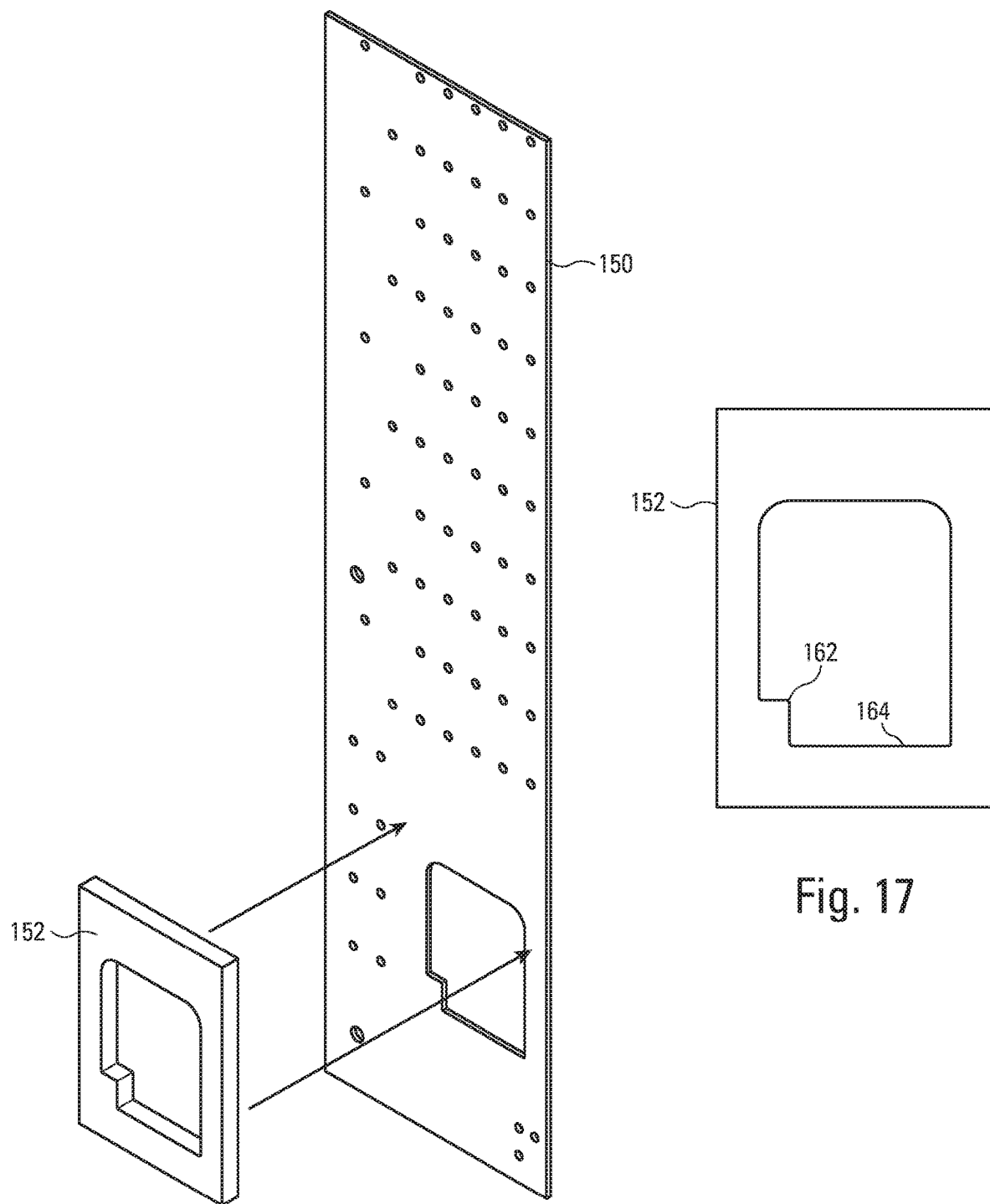
FIG. 16 is an exploded perspective view of a second side plate assembly showing the restraint plate being affixed to the fastening plate according to embodiments of the present technology.
FIG. 17 is a front view of a second restraint plate according to embodiments of the present technology.

Side plate assemblies 104, 106, 108 and 110 fit within respective recessed sections 134, 136, 138 and 140 formed in the front and rear planar surfaces 116, 118 of central panel 102. FIGS. 8-11 show front, rear, edge and exploded perspective views, respectively, of side plate assembly 108 which gets mounted in recess 138 in front planar surface 116. Side plate assembly 108 may include a fastening plate 150 and a restraint plate 152 mounted or otherwise formed on a rear surface of the fastening plate 150 as shown in FIGS. 9-11. The side plate assemblies may also be referred to herein as simply side plates. The fastening plate 150 includes a number of fastening holes 156 for receiving fasteners 158 (FIG. 11) such as for example screws and/or nails. Using the fasteners 158 within holes 156 in fastening plate 150, the side plate assembly 108 may be affixed to the central panel 102 within recessed section 138. The pattern and number of fastening holes 156 may vary in different embodiments, but in general are sufficient to prevent separation of side plate 108 from the central panel 102 under loads experienced by shearwall 100. It is understood that the plates 104, 106, 108 and/or 110 may be bonded to the front and rear surfaces of the central panel 102 by methods other than fasteners 158 and fastening holes 156.

The fastening plate 150 may be generally rectangular and have a length and width as large as the length and width of the first recess 138a. The fastening plate 150 may have shapes other than rectangular, and may have a length and/or width smaller than the length or width of the first recess 138a in further embodiments. The fastening plate 150 may have a thickness equal to the thickness of the first recess 138a so that, once affixed to central panel 102, the side plate assembly 108 may be flush with front planar surface 116. The fastening plate 150 may be thinner or thicker than the first recess 138a in further embodiments. Further embodiments may not have a recess for fastening plate 150. Fastening plate 150 may be formed of a metal, such as for example 10 gauge steel.

In embodiments the restraint plate 152 may be affixed, as by welding or bonding, onto a rear surface of the fastening plate 150. In further embodiments, the restraint plate 152 may be integrally formed with the fastening plate 150, such as for example where the side plate assembly 108 is cast from a mold. The restraint plate 152 is positioned on a rear surface of the fastening plate 150 such that the restraint plate 152 fits within the second, deeper recess 138b when the fastening plate 150 is fastened within recess 138a. In embodiments, the length and width of the restraint plate 152 are smaller than the length and width of the second recess 138b, and the thickness of the restraint plate 152 is less than the depth of the second recess 138b. Thus, when positioned in the second recess 138b, the restraint plate 152 does not contact sides or bottom of the second recess 138b. In one embodiment, the restraint plate 152 may have a length of 6½ inches, a width of 4½ inches and a depth of ½ inches. These dimensions may vary in further embodiments. Where the restraint plate 152 is welded onto fastening plate 150, the weld 161 may be spaced away from the edge 122 as shown for example in FIG. 9. When the central panel 102 deforms as explained below, the weld 161 may fit within detent 135 (FIG. 7) to allow good contact (parallel surfaces) between edges of the restraint plate 152 and the shoulder 137 of the central panel 102 within the second recess 138b.

As noted above, the side plate assembly 108 may include an opening through the fastening plate 150 and through the restraint plate 152. As seen for example in FIG. 12, the opening 160 may be generally rectangular with a chamfer 162 in one corner. In embodiments, the opening 160 may have a length of 4 inches and a width of 3⅛ inches. In embodiments, the chamfer 162 may shorten the length of one side of the opening 160 by ¾ of an inch so that the length of the one side is 3¼ inches, and may shorten a width of one side of the opening 160 by ½ of an inch so that the width of the one side is 2⅝ inches. The size of the opening 160 and chamfer 162 may vary in further embodiments. The chamfer 162 defines a lower surface 164 inside the opening 160 for supporting a bearing plate washer as explained below.

FIGS. 8-12 show an example of side plate assembly 108 provided at one side (i.e., the right side from the front view of FIG. 2) of the front planar surface 116. The side plate assembly 106 may be identical to the side plate assembly 108 at an opposed side (i.e., the right side from the rear view of FIG. 3) of the rear planar surface 118. The side plate assemblies 104 and 110 may be the mirror images of side plate assemblies 108 and 106. FIGS. 13-17 illustrate an example of side plate assembly 104 provided at the other side (i.e., the left side from the front view of FIG. 2) of the front planar surface 116. The side plate assembly 110 may be identical to side plate assembly 104 at a side (i.e., the left side from the rear view of FIG. 3) of the rear planar surface 118.

Figure 18:
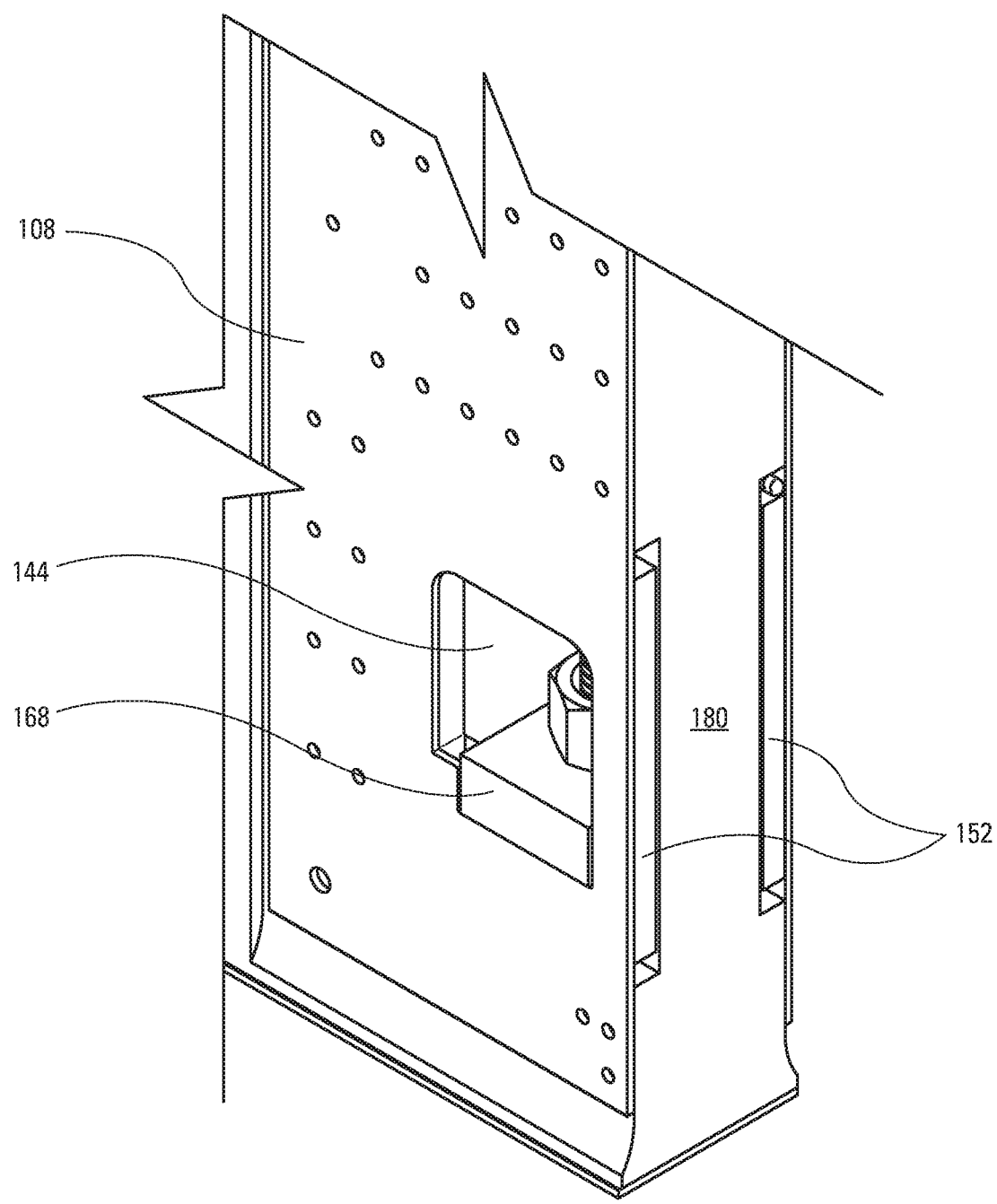
FIG. 18 is a perspective view showing a lower corner of a shearwall including a structural fuse according to embodiments of the present technology.
Figure 19:
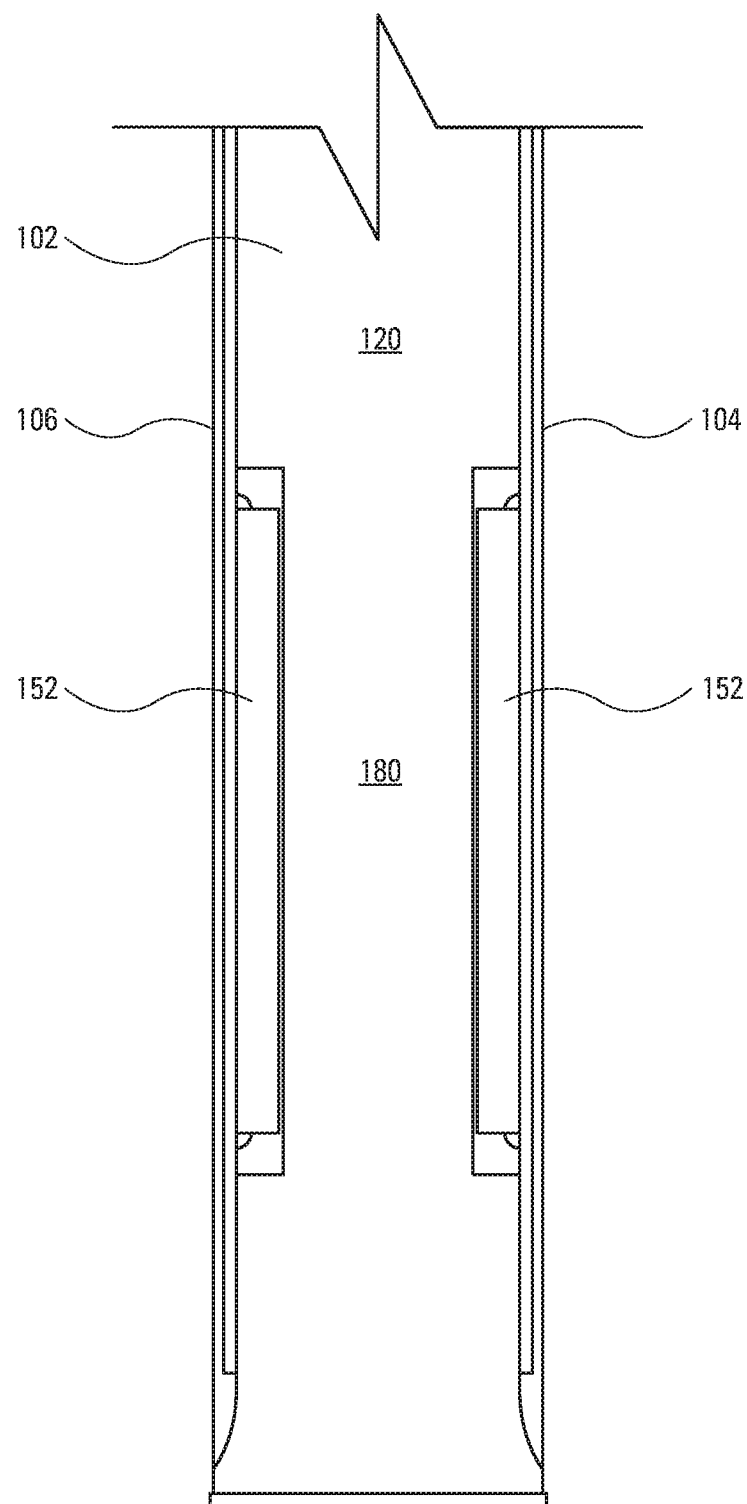
FIG. 19 is an edge view showing a lower corner of a shearwall including a structural fuse according to embodiments of the present technology.

FIGS. 18 and 19 are perspective and edge views, respectively, of a pair of side plate assemblies (e.g., assemblies 108 and 110) affixed to the opposite surfaces 116, 118 of the central panel 102. As shown, the fastening plate 150 lies in contact with the central panel 102 within the first recess 138a. The restraint plate 152 fits within the second recess 138b, spaced from contact with the central panel 102. FIG. 18 also shows a bearing plate washer 168, which extends through the openings 160 in the side plate assemblies 108 and 110, and through the anchor bolt opening 144 in the central panel 102.

FIG. 20 is an exploded perspective view showing additional detail of how the bearing plate washer 168 cooperates with an anchor bolt 170 to secure the shearwall 100 to a foundation 175. As noted, the bearing plate washer 168 (on both sides of the central panel 102) extends through the openings 160 in the pairs of side plate assemblies, and through the anchor bolt opening 144 in the central panel 102. The bearing plate washers 168 rest on bottom surfaces 164 of the corresponding pairs of openings 160. The bearing plate washers 168 are formed of steel and, as shown in FIG. 21, may be rectangular with a length, width and thickness of 3½ inches, 2½ inches, and 1 inch, respectively. Each of these dimensions may vary in further embodiments. Each bearing plate washer 168 may further include an anchor bolt hole having a diameter of 1.125 inches, though the hole may be larger or smaller than that in further embodiments.

Figure 22:
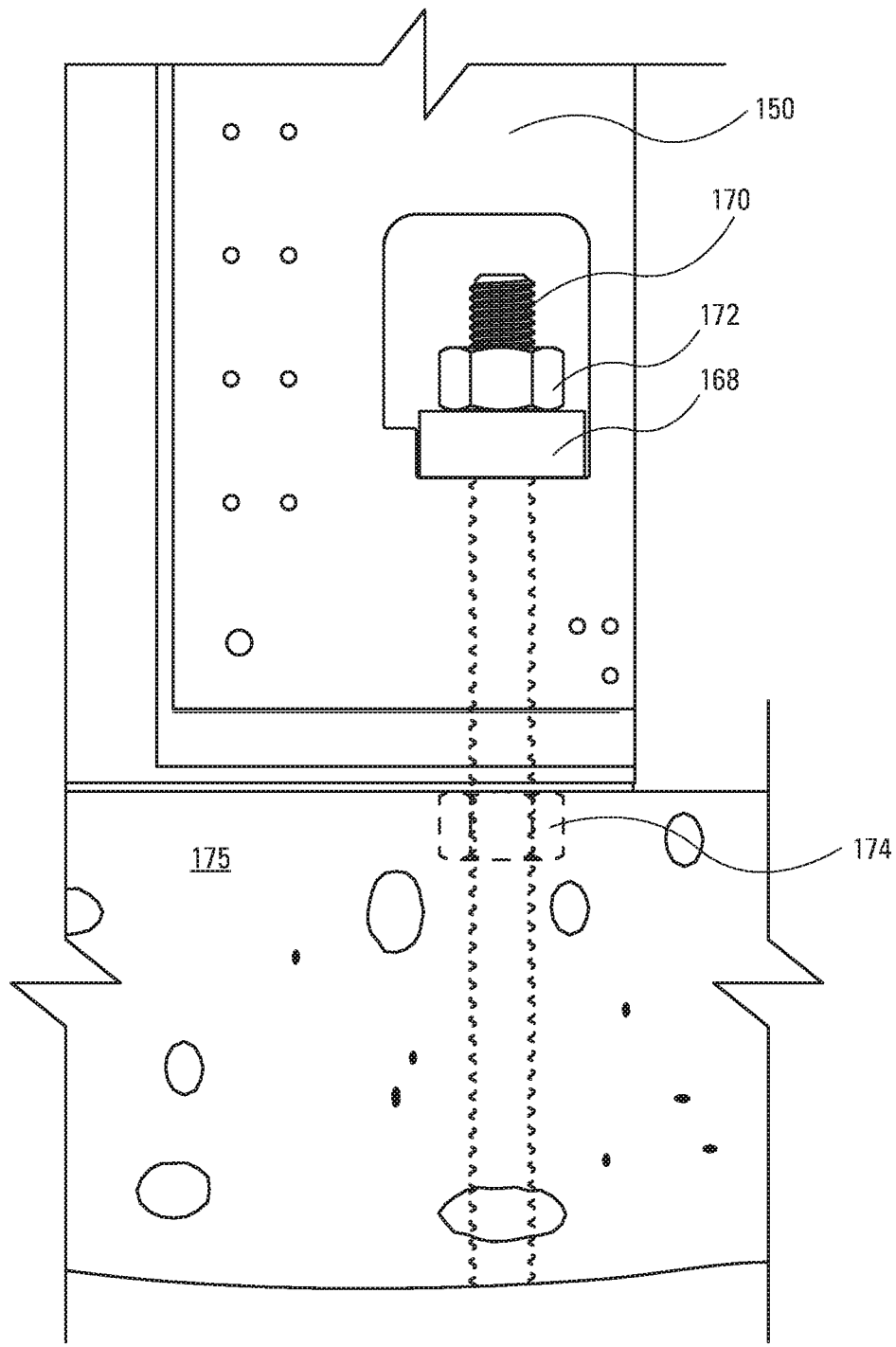
FIG. 22 is a front view of an anchor bolt and bearing washer plate affixing a corner of the shearwall 100 to a foundation.

An anchor bolt 170 is fit through each of the two anchor bolt bores 146, in the bottom surface of central panel 102, which extends up into the anchor bolt openings 144 and through the bearing plate washers 168. The anchor bolts 170 may be affixed to bearing plates washers 168 by a pair of nuts 172 as shown for example in the perspective view of FIG. 22.

The anchor bolts 170 extend down beyond the bottom edge of shearwall 100, where they may be anchored into the concrete foundation or other support surface. A second pair of nuts 174 (FIG. 22) may be provided on the anchor bolts 170 to fix a height of the anchor bolts within the anchor bolt openings 144. It is a feature of the present technology that the plurality of side plates, and shearwall in general, may be engaged by tightening the nuts 172 within the anchor bolt openings 144 to remove any slack within the shearwall 100. In particular, by tightening the nuts 172, the bearing plate washers 168 pull down on the respective pairs of side plate assemblies 104, 106 and 108, 110, which in turn pull the central panel 102 against the second set of nuts 174 on anchor bolts 170. Without such tightening of the nuts 172, slack may exist in the shearwall 100 at various locations and due to various manufacturing tolerances. For example, there may be slack (i.e., loose fit or misalignment) of the fasteners 158 within fastening holes 156. Tightening the nuts 172 removes any such slack to engage the plurality of side plates and shearwall.

It has been found that tightening of the nuts 172 and removing slack within the shearwall 100 enhances the initial stiffness of the shearwall and increases the magnitude of lateral force that the shearwall may transmit at a given lateral displacement threshold. Embodiments of the present technology may require that the nut 172 be tightened to a level defined as finger-tight plus one-half turn. This level of tightening may vary in further embodiments.

Figure 23:
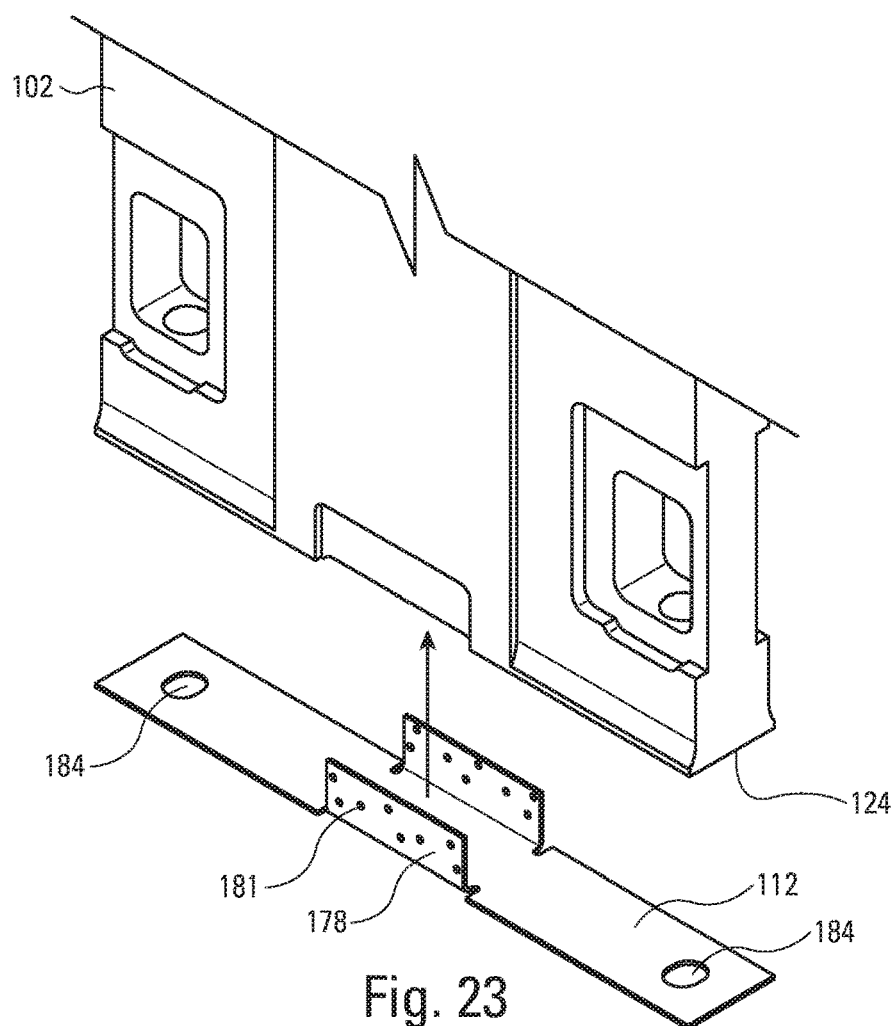
FIG. 23 is a perspective view of a bottom plate affixed to the bottom of a shearwall according to embodiments of the present technology.
Figure 24:
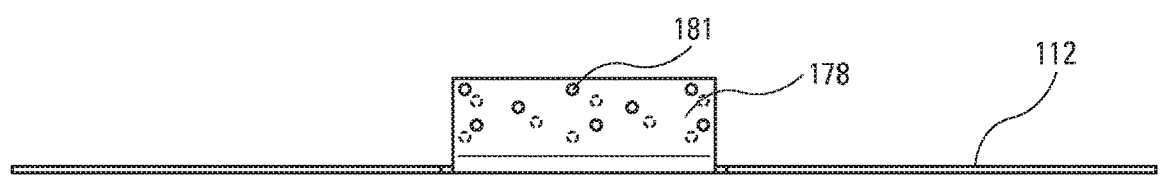
FIG. 24 is a front view of a bottom plate affixed to the bottom of a shearwall according to embodiments of the present technology.
Figure 25:
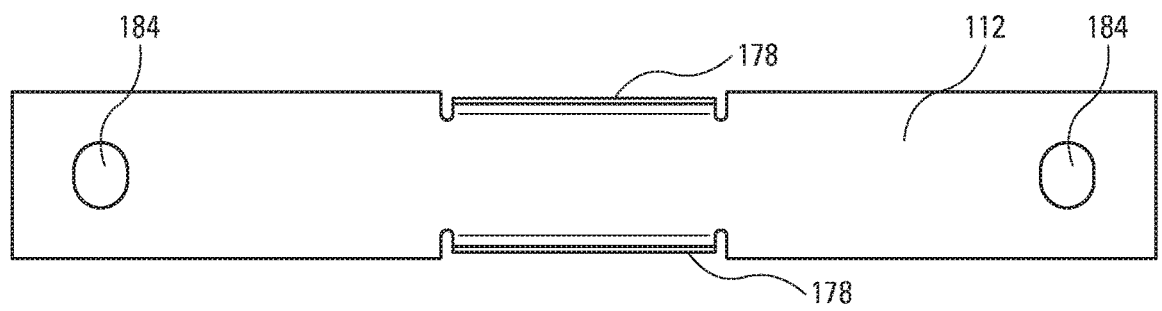
FIG. 25 is a top view of a bottom plate affixed to the bottom of a shearwall according to embodiments of the present technology.

As noted with respect to FIG. 1, a bottom plate 112 may be provided on a bottom edge 124 of the central panel 102. Further details of bottom plate 112 are shown in the exploded perspective view of FIG. 23 and the edge and top views of FIGS. 24 and 25. Bottom plate 112 may be formed for example of 10 gauge steel and may extend across the entire length and width of bottom edge 124. Bottom plate 112 may include a pair of fastening tabs 178 at the front and rear edges of bottom plate 112 which may include fastening holes 181 for receiving fasteners (not shown) such as screws and/or nails for fixing the bottom plate 112 to the central panel 102. As shown in the views of FIGS. 23 and 25, the plate may include openings 184 through which anchor bolts 170 extend. As noted, nuts 174 may be provided over the anchor bolts in contact with a lower surface of the bottom plate 112. Bottom plate 112 may be effective in resisting overturning compressive forces exerted at the bottom corners of the central panel 102, as well as providing an impervious moisture barrier between the central panel 102 and the foundational supporting surface on which shearwall 100 is mounted.

The shearwall 100 as described above provides a high degree of initial stiffness and strength to transmit forces, and ductility to dissipate energy on constructions that may occur during natural phenomena such as seismic activity, high winds, floods and snow loads.

Additionally, it is a feature of the present technology to predictably control how and where the shearwall yields upon shear loads above threshold levels. In particular, as mentioned above for example with respect to FIG. 7, each pair of second, deeper recesses (e.g., 138b and 140b) in opposed lower corners of the central panel 102 together define a narrower width section and panel 102 extending to the edges 120, 122. These two narrower width sections at opposed lower corners of shearwall 100 are referred to herein as structural fuse elements 180, shown in one side for example in FIGS. 7, 18 and 19. In accordance with aspects of the present technology, each fuse element 180 (also referred to herein simply as fuse 180) provides a controlled location at opposite sides of panel 102 for yielding of the shear wall 100 at shear forces above some threshold. When applied lateral shear forces exert stresses on the shearwall above threshold levels, one side of the shearwall will yield, or buckle or fracture, in compression or tension, at the fuse 180. In particular, the fuse 180 will not bear as high an axial load as other portions of the shearwall along edges 120 and 122 and yielding therefore takes place at the fuses 180 as opposed to other positions along the length of shearwall 100. Thus, fuses 180 provide a predictable and controllable manner of yielding on each side of the shearwall 100.

Figure 26:
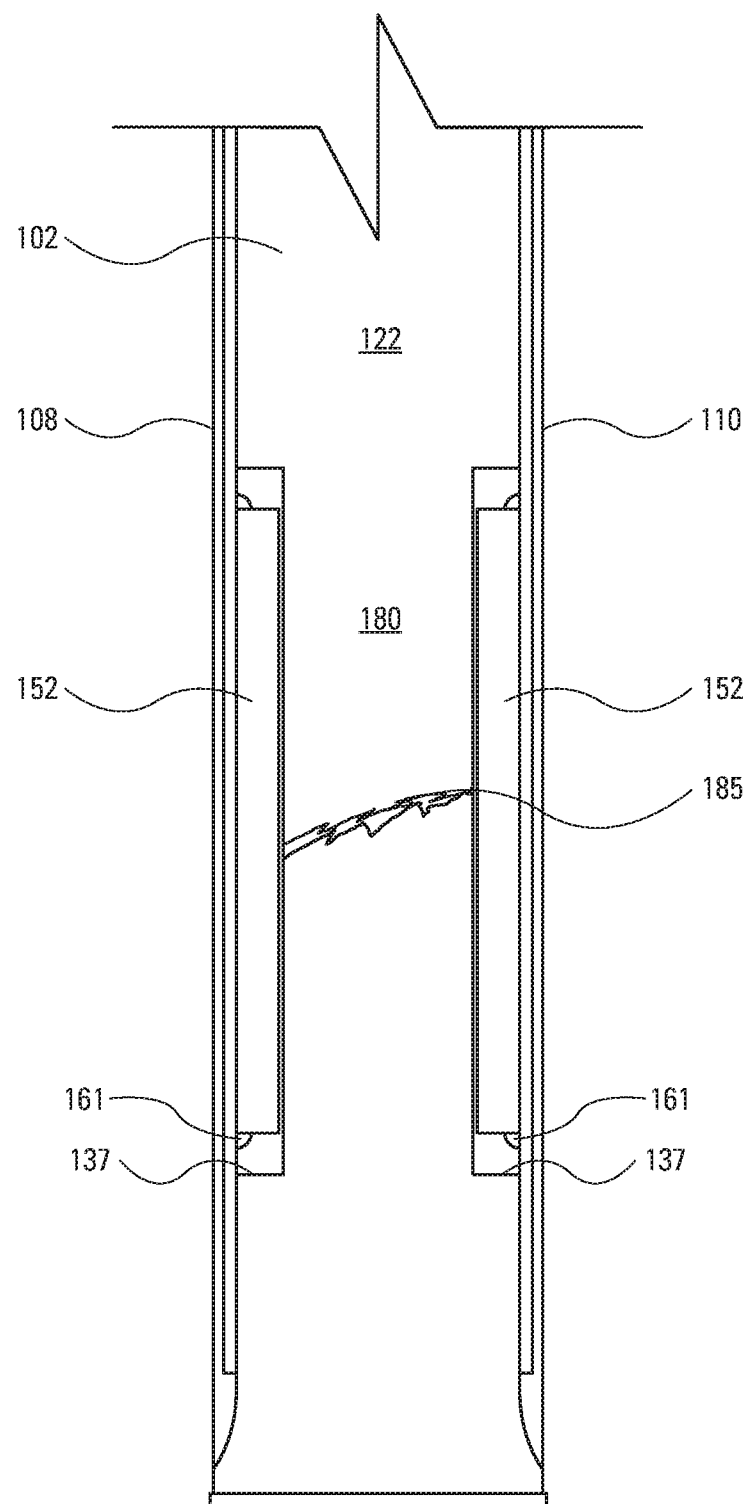
FIG. 26 is an edge view of a bottom corner of a shearwall buckling or fracturing under compressive or tensile loads above threshold levels.
Figure 27:
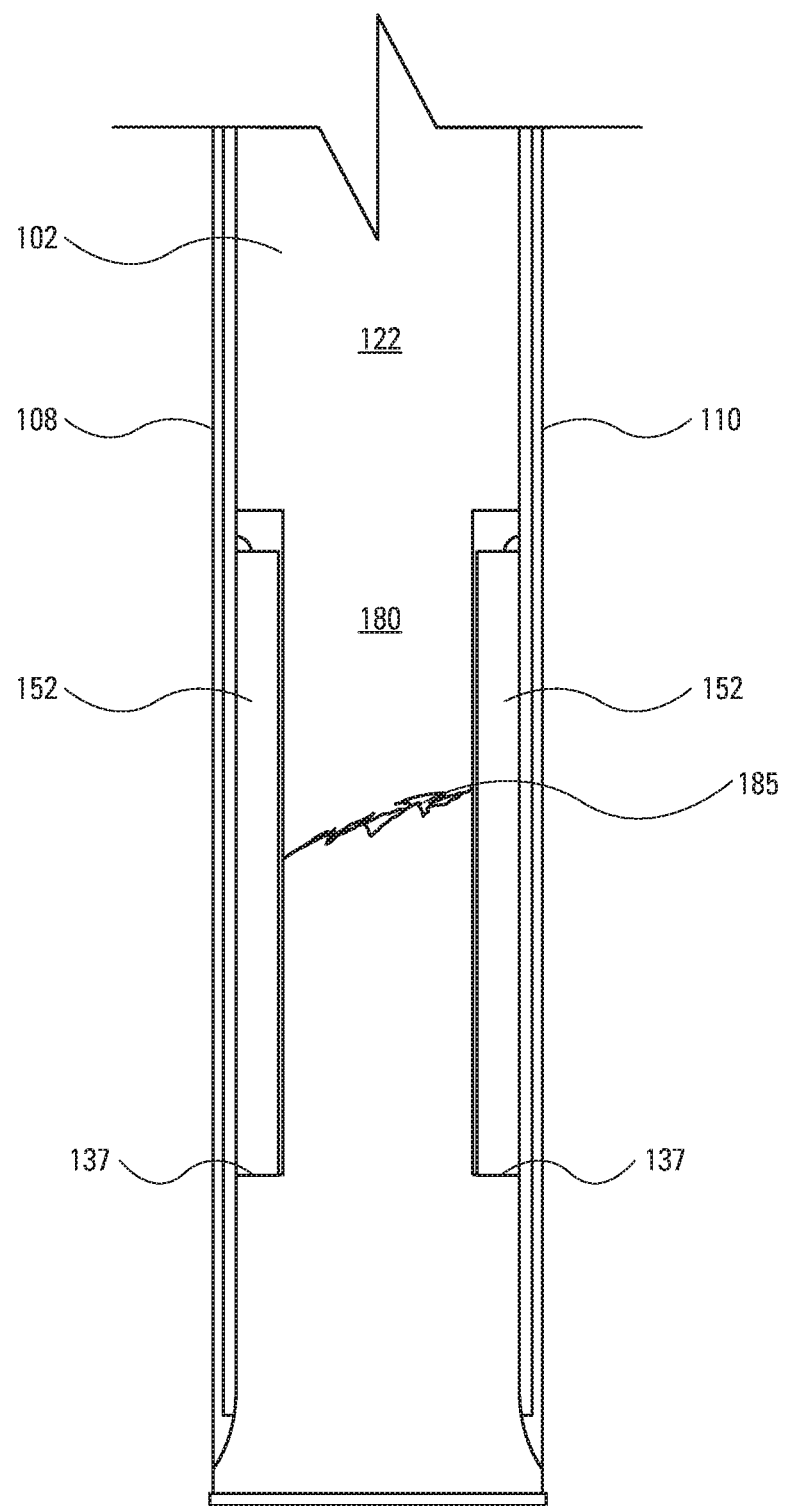
FIG. 27 is an edge view of a bottom corner of a shearwall with restraint plates bearing on recessed surfaces of the shearwall.

FIGS. 26 and 27 illustrate edge views of shearwall 100 yielding, or buckling, or fracture, along one of the edges 120, 122 at fuse 180. It is a further feature of the present technology to provide a high degree of ductility in shearwall 100 after initial yield. In particular, upon yielding, the central panel will fracture (at 185) as shown in FIG. 26. The fracture is shown as being generally horizontal between planar surfaces 116, 118 of the panel 102, but the fracture may be more vertical in further embodiments. As noted above and as shown in FIG. 26, a space may initially exist between a bottom edge of the restraint plates 152 and the shoulder 137 of the central panel 102.

However, as buckling and/or crushing of the central panel 102 continues, the restraint plates 152 of at least one of the pairs of side plates 104, 106 and 108, 110 will move into contact with the shoulder(s) 137 of one or more recesses 138*b*, 140*b*, as shown in FIG. 27. At this point, compressive load is applied to the shoulder 137 of the central panel 102, providing residual strength to the shearwall 100 after initial yield, and only a marginal reduction in lateral-force-resisting capacity by shearwall 100 is observed as displacement levels increase. This is due to the inherent ductility associated with direct bearing of the restraint plates 152 against the fractured central panel 102.

FIGS. 26 and 27 show the shoulder 137 at the edge 122 of the panel 102, and the weld 161 which does not extend to the edge 122. See, for example, FIG. 9. The flat shoulder 137 provides a good bearing surface for the flat bottom edge of the restraint plates 152. Thus, the loads between the shoulders 137 and flat bottom edge of restraint plates 152 is primarily vertical. If there was a non-horizontal angle of contact between the bottom edge of the restraint plates and shoulders 137, this may create horizontal forces which may force the restraint plates to wedge outward to slip off shoulders 137. As noted above, the welds 161 fit within detents 135 (FIG. 7) to prevent such horizontal forces from the welds 161.

It is another feature of the shearwall 100 that it may be constructed with a minimum of welded parts, which can be a source of yielding and fracture under high loads. Aside from a weld affixing the restraint plate 152 to the fastening plate 150, the shearwall 100 may be fabricated without welding. As noted above, in embodiments where the side plates are cast or structurally bonded, even the weld of the restraint plate 152 to fastening plate 150 may be omitted.

Figure 28:
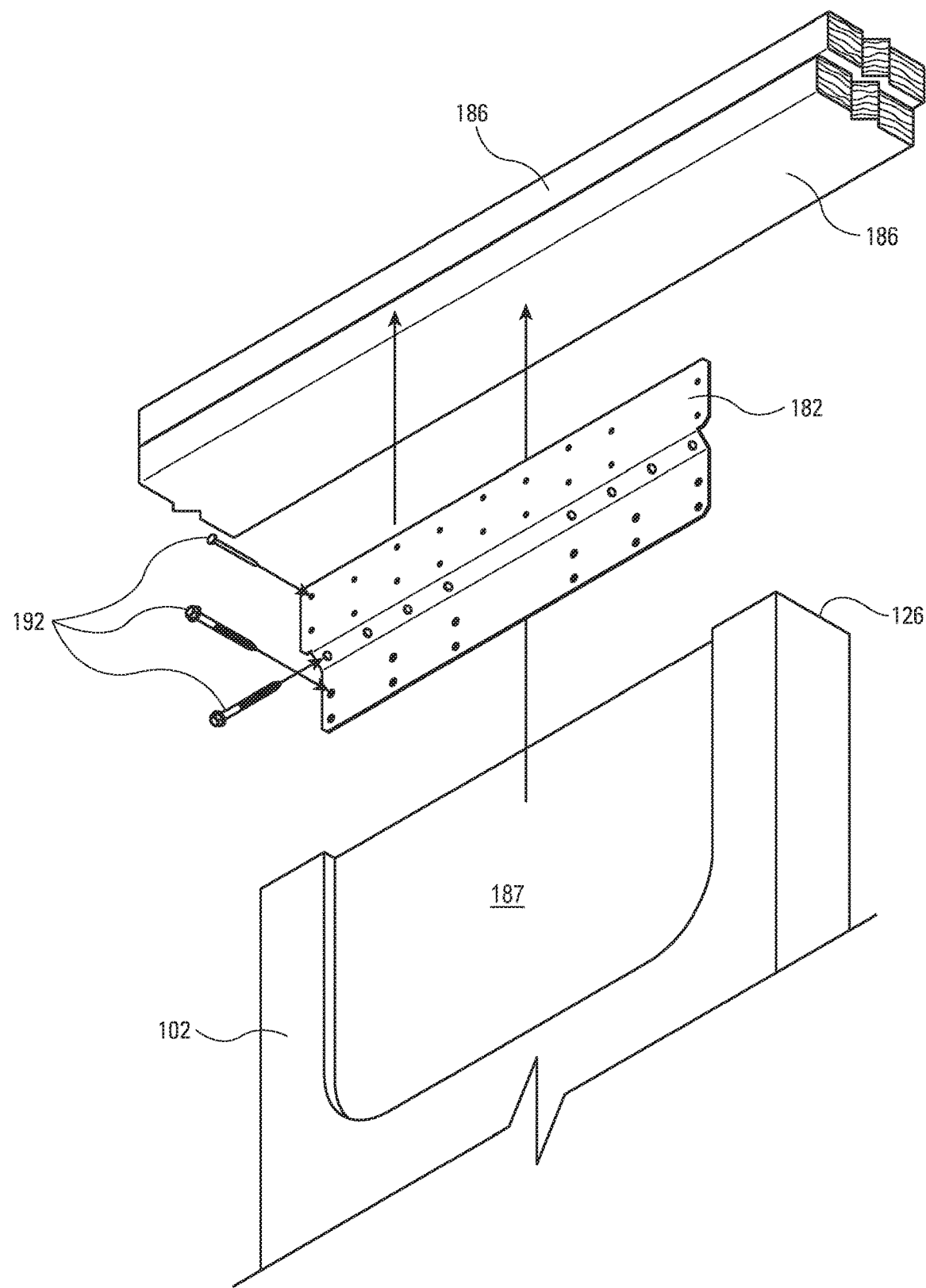
FIGS. 28-30 are exploded perspective, front and edge views of a top plate for affixing a top of the shearwall to an upper support surface according to embodiments of the present technology.
Figure 29:
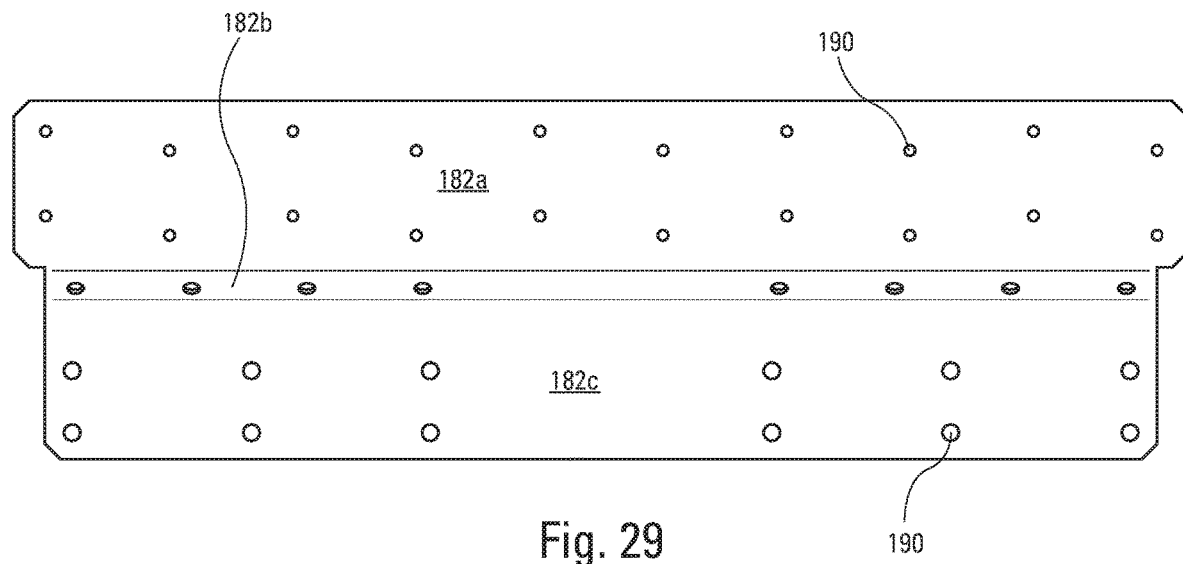
Figure 30:
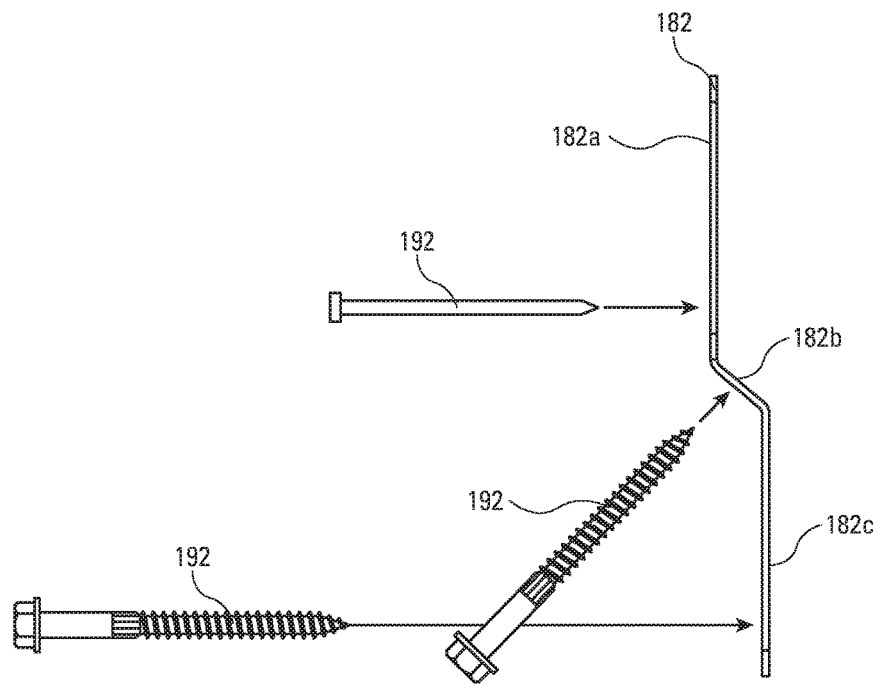

FIG. 28 illustrates an exploded perspective view of a top plate 182 for connecting the upper edge 126 of shearwall 100 to the structural framing 186, 188 or other support surface above shearwall 100. The top plate may mount to an outside face of the shearwall 100, in a routed recess 187. The top plate 182 may include a number of fastening holes 190 for receiving fasteners 192 such as for example screws and/or nails. The fastening holes 190 and fasteners 192 may be used to affix the shearwall 100 to the top plate 182, and the top plate 182 to the structural framing 186, 188. As shown in FIGS. 28-30, the top plate 182 includes generally planar sections 182*a* and 182*c* parallel to surfaces of the structural framing and shearwall, and an angled section 182*b*, between and connecting the planar sections 182*a* and 182*c*. As seen in FIGS. 28-29, the planar section 182*a* may be slightly longer than angled section 182*b* and planar section 182*c*, though it need not be in further embodiments. The angled section 182*b* is provided at an oblique angle to surfaces of the structural framing 186, 188. As seen in FIG. 28, some fasteners 192 may be inserted perpendicularly to planar sections 182*a* and 182*c*, into the structural framing and top section of the central panel 102. Other fasteners 192 may be inserted perpendicularly to angled section 182*c*, and up into the structural framing 186, 188 at an angle. These fasteners 192 at an angle provide additional support for the shearwall 100 respect to the structural framing 186, 188.

Figure 31:
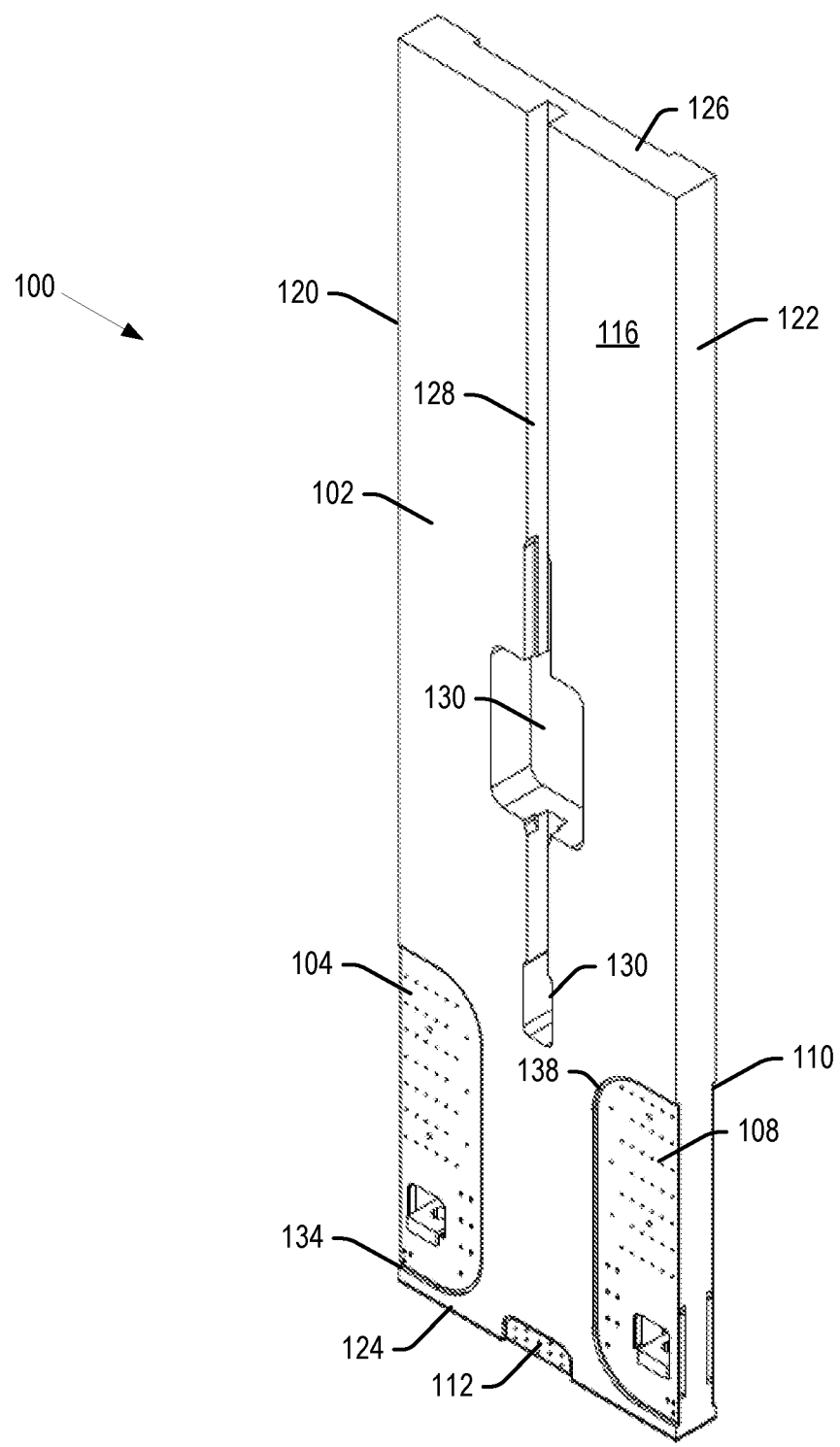
FIGS. 31-32 are front and rear perspective views of a shearwall according to an alternative embodiment of the present technology.
Figure 32:
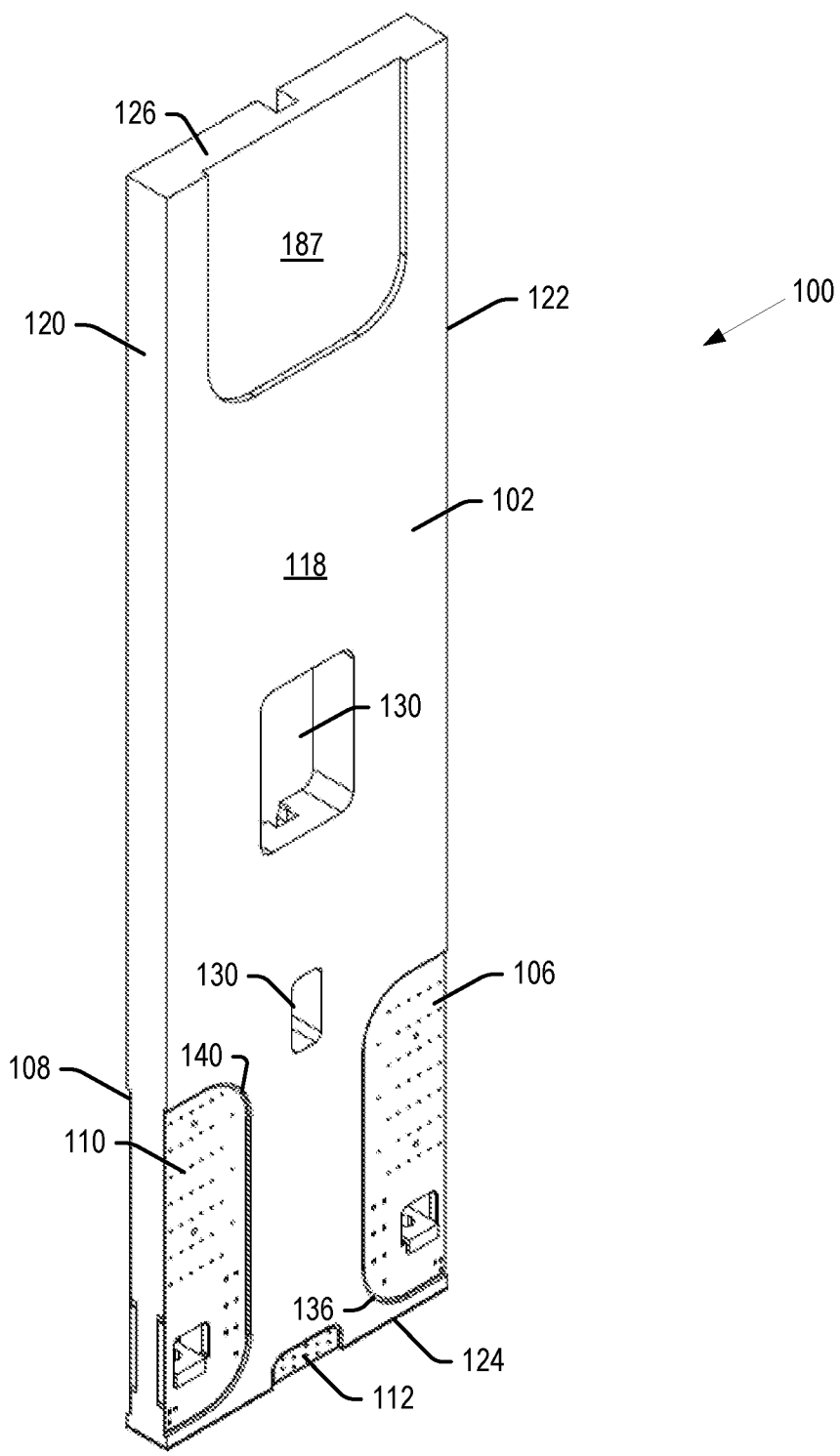

In embodiments described above, side plate assemblies 104, 106, 108 and 110 are substantially rectangular, and fit into substantially rectangular recessed sections 134, 136, 138 and 140 formed in the front and rear planar surfaces 116, 118 of central panel 102. It is understood that the side plate assemblies and recessed sections may have other shapes in further embodiments. One such further embodiment is shown in FIGS. 31-32, illustrating perspective views of the front planar surface 116 and rear planar surface 118, respectively, of shearwall 100. In this embodiment, each of the plate assemblies 104, 106, 108 and 110 may have one or more rounded edges at interior corners of the plate assemblies 104, 106, 108 and 110 (i.e., the corners spaced from edges 120, 122). The radius of curvature of the rounded edges may for example be 4 inches, though the radius may be larger or smaller than that in further embodiments.

As further seen in FIGS. 31-32, the recessed sections 134, 136, 138 and 140 formed in the front and rear planar surfaces 116, 118 of central panel 102 may also have corresponding rounded edges to receive the plate assemblies 104, 106, 108 and 110. Rounding the corners as shown in FIG. 31 reduces the required time for routing the panel 102 to form the recessed sections 134, 136, 138 and 140 as the rounding enables the recesses to be formed in a single pass at each recess plate location with a large-diameter cutting tool. This feature may also alleviate material splintering near the bottom face of the panel 102.

In summary, in one example, the present technology relates to a shearwall for use in constructions, the shearwall comprising: a central panel comprising first and second surfaces; a plurality of side plates configured to be connected to the central panel at lower corners of the first and second surfaces, the side plates further configured to be coupled to a support surface on which the shearwall is mounted; wherein the central panel comprises a fuse, the fuse being a reduced area section of the central panel between the first and second surfaces, the shearwall configured to yield at the fuse.

In another example, the present technology relates to a shearwall for use in constructions, the shearwall comprising: a central panel comprising first and second surfaces and a section having a reduced area between the first and second surfaces; a plurality of side plates configured to be connected to the central panel at lower corners of the first and second surfaces, the side plates further configured to be coupled to a support surface on which the shearwall is mounted, the plurality of side plates comprising restraint plates, the restraint plates positioned within the section of the central panel having a reduced area and the restraint plates configured to inhibit buckling or fracture of the central panel after initial buckling of the central panel.

In a further example, the present technology relates to a shearwall for use in constructions, the shearwall comprising: a central panel comprising first and second surfaces, and a section having a reduced thickness between the first and second surfaces; a plurality of side plates comprising: fastening plates for fastening the side plates to the central panel, and restraint plates on the fastening plates, the restraint plates of first and second side plates fitting within the section of the central panel having a reduced area; wherein the section in the central panel of reduced area provides a predictable location of yielding of the shearwall; and wherein the restraint plates provide ductility after initial yielding of the shear wall by opposing yielding of the central panel after initial yielding of the shearwall.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A shearwall for use in constructions, the shearwall comprising:
   a central panel comprising first and second surfaces;
   a plurality of side plates configured to be connected to the central panel at lower corners of the first and second surfaces, the side plates further configured to be coupled to a support surface on which the shearwall is mounted;
   wherein the central panel comprises a fuse, the fuse being a reduced area section of the central panel between the first and second surfaces, the shearwall configured to yield at the fuse.

2. The shearwall of claim 1, wherein the central panel is formed of at least one of natural wood and engineered wood.

3. The shearwall of claim 1, wherein the central panel is formed of at least one of glulam, cross laminated timber laminated veneer lumber, laminated strand lumber, and parallel strand lumber.

4. The shearwall of claim 1, wherein the side plates are formed of steel.

5. The shearwall of claim 1, wherein the side plates comprise a fastening plate and a restraint plate.

6. The shearwall of claim 5, wherein the restraint plate is welded or structurally bonded to the fastening plate.

7. The shearwall of claim 5, wherein the fastening plate fits within a first recess formed in the first and second surfaces of the central panel.

8. The shearwall of claim 7, wherein the restraint plate fits within a second recess formed in the first and second surfaces of the central panel, the second recess in the first and second surfaces being deeper than the first recess.

9. The shearwall of claim 8, wherein the second recess in the first and second surfaces defines the fuse.

10. The shearwall of claim 9, wherein the restraint plates are configured to inhibit buckling of the central panel at the fuse.

11. The shearwall of claim 1, wherein the side plates include restraint plates configured to fit within the reduced area section of the central panel corresponding to the fuse.

12. The shearwall of claim 11, wherein the restraint plates are configured to inhibit buckling of the central panel at the fuse.

13. The shearwall of claim 1, wherein the side plates are coupled to the support surface by an anchor rod extending into the support surface at a first end, and coupled to the side plates at a second end opposite the first end.

14. The shearwall of claim 13, wherein the plurality of side plates is engaged by tightening of the nut to remove slack in the shearwall.

15. The shearwall of claim 14, further comprising first and second nuts on the anchor rod for affixing the anchor rod to the shearwall, wherein the plurality of side plates is engaged by tightening at least one of the nuts.

16. The shearwall of claim 1, wherein first and second side plates of the plurality of side plates are aligned with each other at corners of the first and second surfaces of the central panel, the first side plate including a first opening, the second side plate including a second opening, and the central panel including a third opening extending between the first and second surfaces, the first, second and third openings aligned with each other.

17. The shearwall of claim 16, further comprising an anchor rod extending into the support surface at a first end, and extending into the third opening at a second end opposite the first end.

18. The shearwall of claim 17, further comprising a bearing washer plate supported on edges of the first and second openings of the first and second side plates, the anchor rod extending through a hole in the bearing washer plate and affixed to the bearing washer plate by a nut.

19. The shearwall of claim 18, wherein the nut is tightened to engage the plurality of side plates and to remove slack in the shearwall.

* * * * *